US012579020B2

(12) United States Patent　　(10) Patent No.: US 12,579,020 B2
Fiske　　(45) Date of Patent: Mar. 17, 2026

(54) CIRCUITS, MACHINES AND SYSTEMS THAT HEAL

(71) Applicant: Michael Stephen Fiske, San Francisco, CA (US)

(72) Inventor: Michael Stephen Fiske, San Francisco, CA (US)

(73) Assignee: Fiske Software LLC, San Francisco, CA (US)

( * ) Notice: Subject to any disclaimer, the term of this patent is extended or adjusted under 35 U.S.C. 154(b) by 25 days.

(21) Appl. No.: 18/393,736

(22) Filed: Dec. 22, 2023

(65) Prior Publication Data

US 2024/0231999 A1　　Jul. 11, 2024

Related U.S. Application Data

(60) Provisional application No. 63/608,193, filed on Dec. 9, 2023, provisional application No. 63/435,223, filed on Dec. 23, 2022.

(51) Int. Cl.
　　*G06F 11/07*　　(2006.01)
　　*G06F 8/41*　　(2018.01)
(52) U.S. Cl.
　　CPC .......... *G06F 11/0793* (2013.01); *G06F 8/443* (2013.01); *G06F 11/0721* (2013.01)

(58) Field of Classification Search
　　CPC ................. G06F 11/0793; G06F 8/443; G06F 11/0721; H03K 17/16; H03K 17/161; H03K 17/165; H03K 19/00315; H03K 19/007
　　See application file for complete search history.

(56) References Cited

U.S. PATENT DOCUMENTS

| | | | | |
|---|---|---|---|---|
| 6,163,584 A | * | 12/2000 | Weng | ...................... H03K 5/135 370/503 |
| 2009/0267660 A1 | * | 10/2009 | Milton | .................... H04L 7/033 327/145 |

* cited by examiner

*Primary Examiner* — Daniel D Chang

(57) ABSTRACT

This invention pertains to machines, circuits, and programs that can heal, using a principle of self-modifiability. In some embodiments, a machine can self-modify its machine instructions when one or more instructions are missing or corrupted or malfunctioning. In some embodiments, a machine uses a meta instruction to heal its instructions. In some embodiments, the invention describes a flip-flop circuit that can heal its computation when the circuit is sabotaged by a noise attack. In some embodiments, a self-modifiable circuit uses meta variables and meta operators as a part of the circuit design to heal the circuit when it is attacked.

2 Claims, 26 Drawing Sheets

Self-Modifiable Electronic Circuit

An Archimedean Screw

$D$ Flip-flop Circuit

FIG. 3

$D$ Flip-flop Logic

| Time | CLK | $D(t)$ | $Q(t+1)$ | $\overline{Q}(t+1)$ |
|------|-----|--------|----------|---------------------|
| $t$ | Rising Edge | 0 | 0 | 1 |
| $t$ | Rising Edge | 1 | 1 | 0 |
| $t$ | Non-Rising | $\{0,1\}$ | $Q(t)$ | $1 - Q(t)$ |

Doorbell Circuit

FIG. 4B

A Malfunctioning C Program

```
aemea@Michaels-MacBook-Air C_program % ./ADD 2 3 5 result = 10. address of addition  =
1 0 1 0 1 1 0 0 0 1 0 1 0 0 0 0 result = 30. address of multiply  =
1 0 1 0 1 1 0 0 0 1 1 1 0 0 0 0
```

A Red-Blue Coloring of Graph $K_5$

Pulses Sent to Element E

FIG. 7

Sum of Input Pulses to E

| Time | 2 | 3 | 4 | 5 | 8 | 9 | 12 |
|---|---|---|---|---|---|---|---|
| Sum of Pulses | 0 | 14 | 14 | 10 | 7 | −2 | 0 |

Flip-flop Vector Field

Input Signal $\mathcal{I}(t)$

Toggled Flip-Flop

Toggled Flip-Flop

Noise Components

Noise Pulse

Noise Pulse Disrupts Flip-Flop Computation

Meta Operator 1 Detects Noise Injection

Meta Operator 2 Heals Noise Orbit

Noise $\eta(t)$ versus Input $\mathcal{I}(t)$

Two Noise Pulses

Variables $u_2$ and $u_4$ attacked

Meta Operator 5 Heals Two Noise Pulses

Meta Operator 5 Near Bifurcation

Meta Operator 5 Heals Two Noise Pulses

Self-Modifiable Electronic Circuit

Voltage Difference Circuit

NAND GATE CIRCUIT

CIRCUITS, MACHINES AND SYSTEMS THAT HEAL

RELATED APPLICATIONS

This application claims priority benefit of U.S. Provisional Patent Application with Ser. No. 63/435,223, entitled "Machines and Systems that Heal", filed Dec. 23, 2022, which is incorporated herein by reference. This application claims priority benefit of U.S. Provisional Patent Application with Ser. No. 63/608,193, entitled "Circuits, Machines and Systems that Heal", filed Dec. 9, 2023, which is incorporated herein by reference.

BACKGROUND—FIELD OF INVENTION

These invention(s) broadly relate to computing machines (hardware and software) and electronic circuits.

BRIEF SUMMARY OF OUR INVENTION(S)

Malware plays a key role in attacking computer systems [1]. Typically, malware sabotages the purpose of the machine instructions executing on a digital computer. Also, there is no computational mechanism or machine method in the prior art of digital computers and register machine model [2, 3, 4] for healing (self-repairing) damaged instructions. On pages 124-163 of [2], Knuth describes a specific register machine model, called MIX. Processor architectures, such as the Intel Core i7 and ARM Cortex-A8, are covered in [4]; these architectures specify physical realizations of the register machine model.

Our invention(s) describe systems that heal from a broader implementation than the register machine model and digital computers so that our machine-implemented methods may also be applied to systems [5] of machines, which have subsystems that do not solely rely on executing digital computer instructions. Some systems can be implemented with analog machines such as an Archimedean screw [6]. FIG. 1 shows an Archimedean screw: In [6], equation (10) models the volume of fluid flow passing through an Archimedean screw; equation (10) is an analytic equation over the real numbers.

At any moment, a register machine's state lies in a countable phase space; on the other hand, some physical systems [7] are more aptly modelled by a flow on a metric space [8] that is a continuum. A continuum is often defined as a compact, connected, metric space or a compact, connected, Hausdorff space [9]. Sometimes a continuum is not compact. The real numbers are a continuum. The continuum property has important design implications when building self-modifiable physical systems that perform a useful task.

Our invention(s) pertains to machines, systems, or electronic circuits that perform tasks: for example, the energy system in mitochondria, or an autonomous transportation system. Our primary goal is to develop and enhance the implementation of machine-implemented methods of repairing a system when the system is malfunctioning. In the field of biology, a malfunctioning system, in some cases, is called a disease. Herein, we describe novel machine-implemented methods in our invention(s):

How to apply self-modifiability as a machine-implemented method to heal (self-repair) machines, machine instructions or a system of various machines.

How to physically implement self-modifiability in order to heal circuits, systems, machines or machine instructions.

Hitherto there has not been an invention or discovery of self-modifiable differential equations; to date there has not been a scientific language or formal system of machine-implemented methods for describing how to heal differential equations or computer instructions. These are important invention(s) so that we can design and improve systems that protect our critical infrastructure and health: biological systems, energy systems, GPS, manufacturing systems, and transportation systems.

One of our inventions defines, describes and applies self-modifiability and its machine-implemented methods in machines and physical systems such as an electronic circuit. Our invention(s) describe how to heal (self-repair) a malfunctioning system or machine, or network of machines, or an electronic circuit, or a network of electronic circuits. A computational machine is described that can simultaneously execute multiple machine instructions and a software simulation is described. The machine's simultaneous execution property enables to use one or more machine-implemented methods to repair instructions that have been damaged or removed; specifically, these machine-implemented methods use self-modifiability (via meta instructions) to heal damaged instructions. Another class of embodiments of our inventions uses self-modifiable methods to build electronic circuits that can heal.

Computation is typically implemented with a group of machines or system or circuits that perform a task. In an embodiment, one or more machines or circuits performing a useful task are executing cryptographic machine instructions that encrypt a message. In an embodiment, the cryptographic instructions sign a message so it can be authenticated. In an embodiment, one or more machines or one or more circuits performing a useful task are executing machine learning instructions that implement deep learning. In an embodiment, the execution of the deep learning by these machine instructions is based on large language model. In an embodiment, one or more machines or circuits performing a useful task are executing the TCP/IP protocol. In an embodiment, one or more machines or circuits performing a useful task are executing machine instructions that comprise an operating system. In an embodiment, one or more machines or circuits performing a useful task are executing machine instructions that are retrieving data from a database.

Our invention(s) describe and define meta variables (implemented in hardware or software) and meta operator machines, and show how to add or replace variables and differential equations in machines and electronic circuits: these machine-implemented methods and circuit-implemented methods are novel and necessary inventions for figuring out and healing a malfunctioning machine or a malfunctioning program or a malfunctioning circuit. Meta variables and meta operator machines provide general machine-implemented methods for healing a system, machine, or circuit that performs a useful task.

DESCRIPTION of FIGURES

In the following figures, although they may depict various examples of the invention, the invention is not limited to the examples depicted in the figures.

FIG. 3. shows a table, describing the digital logic of a D flip-flop. According to row 3, if CLK is a non-rising edge at time t, then output state $Q(t+1)$ at time t+1 stays the same as $Q(t)$. According to rows 1 and 2, if CLK is a rising edge at time t, then the next output state $Q(t+1)$ at t+1 is set to the current value of the data input D(t). If D(t)=1, then output state $Q(t+1)$ is set to 1; If D(t)=0, then output state $Q(t+1)$ is set to 0.

FIG. 4B shows an embodiment of a C program that malfunctions when one bit is flipped in a machine instruction.

FIG. 7 shows a table of the sum of the input pulses to element E as a function of time. Table shows amplitude values, corresponding to FIG. 6.

FIG. 14 represents the state of the prior art that is unable to repair or heal a noise injection on flip-flops.

SOME APPLICATIONS OF SELF-MODIFIABLE ELECTRONIC CIRCUITS

Recent research has shown how adversarial electronic interactions can disable systems. Insulin injectors have been sabotaged so that the spurious reporting of the insulin level erratically turns off and on the flow of insulin [10]. In another medical device attack, electronically sabotaged pacemakers can produce dangerous shock commands [11]. Injecting clock glitches can skip cryptographic instructions [12].

Out-of-band signal injection attacks alter the measurements of sensors or actuator inputs at the hardware layer [13]. These attacks target the conversion process from a physical quantity to an analog property.

Typically, hardware attacks sabotage the intended dynamical behavior of the electronics. Moreover, there are currently no general mathematical models for describing how an extreme electromagnetic injection (EEMI) attack propagates in electronic components [15].

Current flip-flops are electronic circuits that have two stable physical states which can store information (0 or 1). A flip-flop's state is changed when signals are applied to one or more of its control inputs. Flip-flops are fundamental storage elements in sequential logic.

Figure 1:
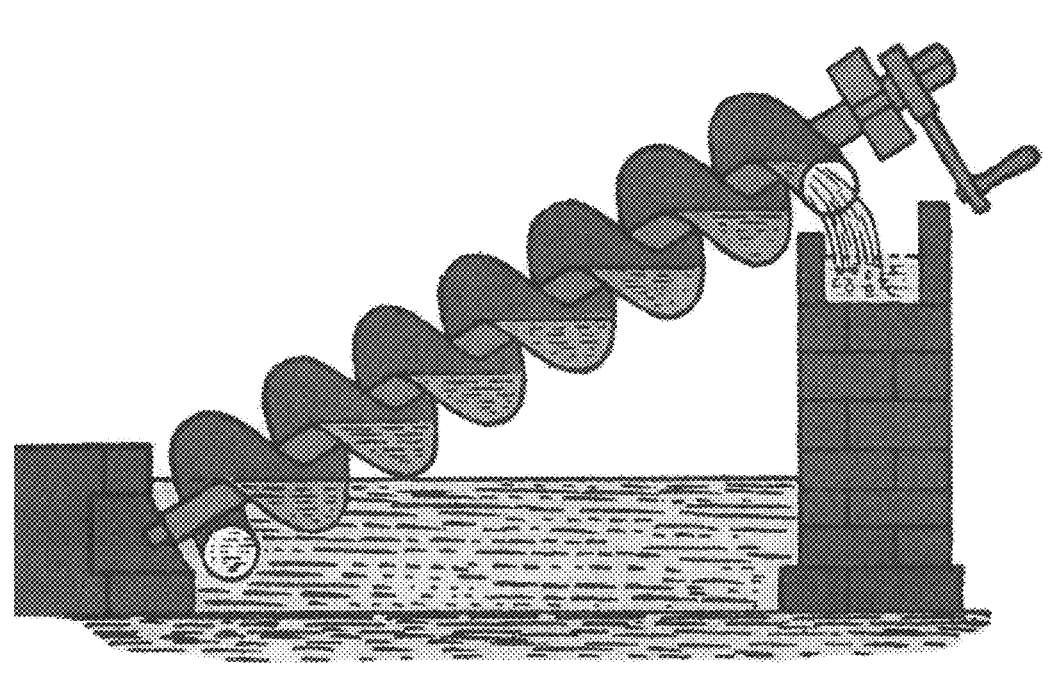
FIG. 1 shows an Archimedean screw. It is an embodiment of an analog machine.
Figure 2:
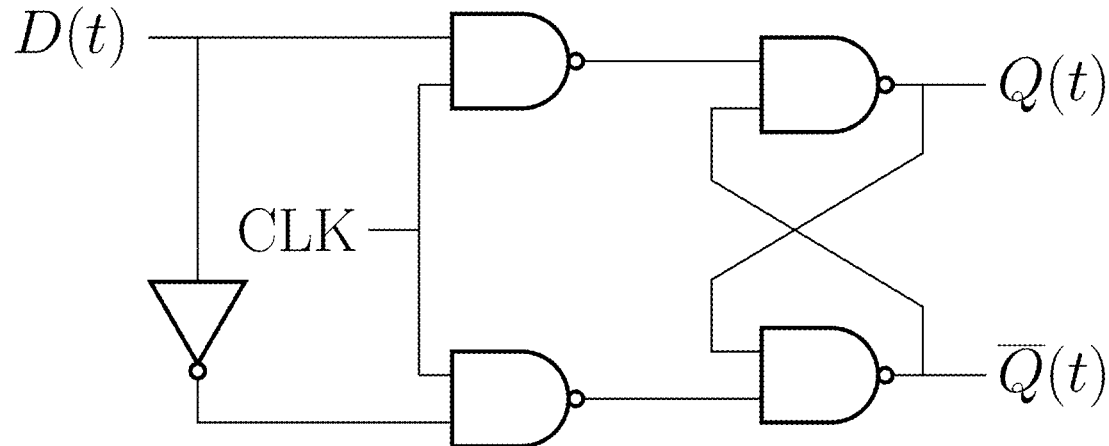
FIG. 2 shows an embodiment of a D flip-flop circuit, composed of one not gate and 4 nand gates, two output states $Q(t)$ and $\overline{Q}(t)$, a clock input (CLK), and a data input $D(t)$. The data input $D(t)$ is stored when CLK input goes high. In terms of digital logic, using 0s and 1s, $\overline{Q}(t)=1-Q(t)$. When $Q(t)=1$, then $\overline{Q}(t)=0$. When $Q(t)=0$, then $\overline{Q}(t)=1$.

FIG. 2 shows a D flip-flop circuit, composed of four NAND gates and one NOT gate. CLK is the clock input. D(t)

is the data input value (0 or 1) of the D flip-flop at time t. At time t, Q(t) is an output state (0 or 1), and $\overline{Q}(t)=1-Q(t)$ is an output state too.

D flip-flops are commonly used in digital electronics to build computers and communication systems. One of our inventions applies self-modifiable circuits, using differential equations, in order to stabilize a D flip-flop during a noise attack. Another invention introduces meta variables as a new hardware tool for detecting if a flip-flop orbit has been manipulated. When implemented in hardware or software, meta variables and meta operators can heal a flip-flop orbit disrupted by noise. Overall, we invent new circuits, methods and machines in hardware and software for healing a system that performs a task.

Machine Implemented Healing Methods Advance the Prior Art

Figure 4A:
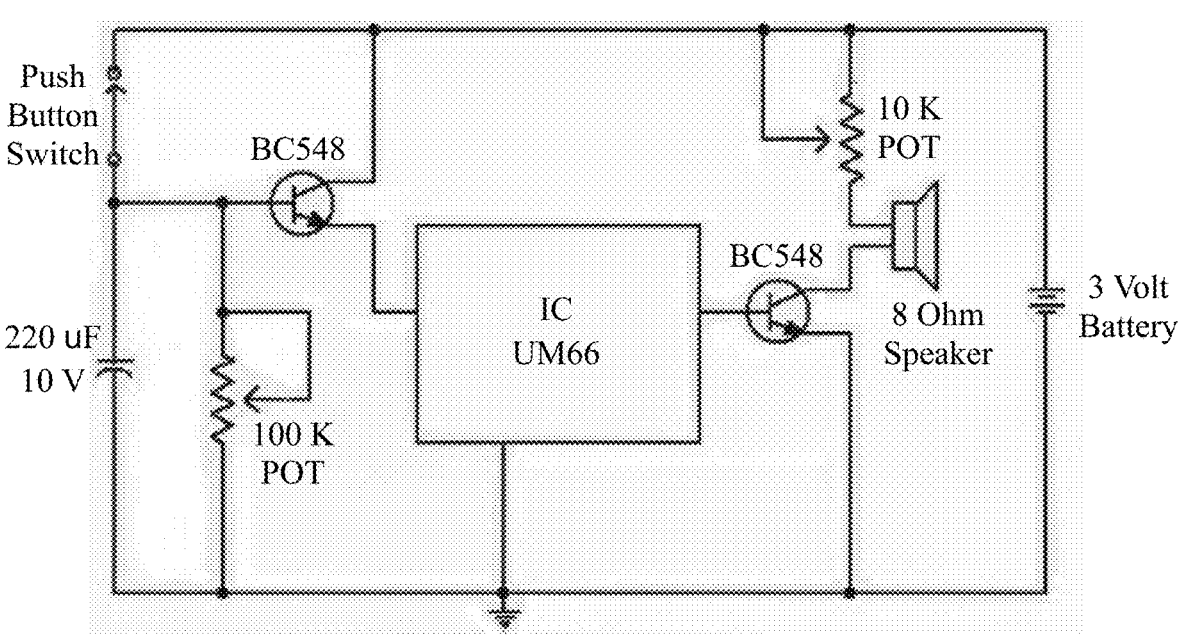
FIG. 4A shows an embodiment of a doorbell circuit, whose behavior is better described by differential equations than a program of register machine instructions.

FIG. 4A shows a doorbell circuit. This system can be damaged by shorting the two inputs of the speaker; alternatively, degradation of the insulation around the speaker leads can lead to a malfunctioning doorbell system. The circuit can be modelled with a set of differential equations. When the speaker leads are shorted or cut, the doorbell circuit is malfunctioning and the differential equations modelling the doorbell circuit have changed. Our machine-implemented methods and in some embodiments, self-modifiable circuits repair circuits or machines that have been damaged. One goal of our invention(s) is to heal them back to circuits (healed differential equations) that execute a working doorbell system. These methods of healing machines or systems are applicable to a shorted transistor or malfunctioning flip-flop, as their hardware is governed by one or more differential equations.

A Malfunctioning C Program

We describe an example of a computer program that malfunctions when one bit is sabotaged. We demonstrate this with C source code that adds 3 integers. This C code shows how a 1-bit change to the address of only one instruction can substantially alter the program's behavior so that the C program is malfunctioning.

```
#include <stdio.h>
#define NUM_BITS 16
int pow2[NUM_BITS] = {0x8000, 0x4000, 0x2000, 0x1000, 0x800,
                      0x400, 0x200, 0x100, 0x80, 0x40, 0x20,
                      0x10, 0x8, 0x4, 0x2, 0x1};
int addition(int a, int b)   {
    return (a + b);
}
int multiply(int a, int b)   {
    return (a * b);
}
int exec_op(int* num, int n, int (*op) (int, int))   {
    int i, v = num[0];
    for(i = 1; i < n; i++)
    {
        v = op(v, num[i]);
    }
    return v;
}
void print_numbers(int* v, int n)   {
    int k;
    printf("\n");
    for(k = 0; k < n; k++)
    {
        printf("%d   ", v[k] );
    }
}
void print_binary(unsigned int v)   {
    int k;
    for(k = 0; k < NUM_BITS; k++)
    {
```

-continued

```
        if (v / pow2[k])  printf("1 ");
        else              printf("0 ");
        v %= pow2[k];
    }
    printf("\n");
}
int bop(int* m, int n, char* f, int (*op) (int, int))   {
    int v = exec_op(m, n, op);
    printf("\nresult = %d. address of ", v);
    printf("%s = \n", f);
    print_binary((unsigned int) op);
    return 0;
}
int main(int argc, char* argv[ ])   {
    int num[3] = {2, 3, 5};
    print_numbers(num, 3);
    printf("\n");
    bop(num, 3, "addition", addition);
    bop(num, 3, "multiply", multiply);
    return 0;
}
```

FIG. 4B shows an execution of the compiled C program: ADD. A sum 2+3+5 is converted to a product 2*3* 5, by flipping only one bit of the address of instruction addition. This C program malfunctions when a small change (flipping one bit) in the C program causes a substantial change to the outcome: namely, a sum equal to 10 is changed to a product equal to 30.

A Principle of Self-Modifiability

A computer program can be viewed as a discrete dynamical system [16]. A set of differential equations specifies a different type of dynamical system that can sometimes model analog machines. When a dynamical system that performs a task is changed so that the task is no longer adequately performed, it is desirable to have a process or mechanism to heal the system. This means that part of the system should detect a change and part of the system should self-modify the damaged system back to the original system that adequately performed the task. A dynamical system that can change itself is called self-modifiable.

A more concrete way to think about this is to view a dynamical system as a system that is governed by a collection of rules. In the case of differential equations, each equation is a rule; in a computational machine, each machine instruction is a rule. A dynamical system is self-modifiable if it can change its own rules: this means the dynamical system can add new rules to itself; it can replace current rules with new rules; or it can delete (remove) rules. Usually, a self-modifiable dynamical system is non-autonomous because the rules governing its behavior can change as a function of time.

In the section titled "The Active Element Machine" we describe a computational machine that can add new rules or delete rules when a "dynamical event" occurs during the machine's execution. Overall, our machine uses "meta instructions" to change its own rules.

Some Prior Art and Science

Related work on self-repair and self-modification is split between biology and computer science. Biology focuses on understanding biological complexity [17, 18] and DNA repair [19]. Computer science emphasizes implementations of code repair and AI.

DNA repair [20] has been extensively studied for over fifty years. The models of DNA explain repair at the biomolecular level [19], but they do not propose a self-modifiability principle, based on adding new rules or replacing rules; and they do not provide a computational mechanism or a machine for healing a system or another machine.

In [21], self-modifying systems are proposed as a means for understanding the development of complexity in biology: "the popular belief is that the increase of complexity in evolution poses no deep or unsolved problem." Subsequently, the author observes, "the increase of complexity becomes a deep problem", and paradoxically states, "We shall see that in a formal system complexity can never increase at all." The paradox is due to the author using Turing machines as the formal model to explain the development of biological complexity. The rules of a Turing machine do not change, so there is not any notion of self-repair or healing.

The mathematics described in [21] doesn't actually self-modify: e.g., there is no formalism for adding new variables and equations as time proceeds. Moreover, Turing machines are described in [21]'s "self-modifying systems", even though the rules governing a Turing machine program stay fixed. The author's choice of using Turing machines as a model of "self-modifying systems" begs the following question: How can the complexity of a biological system increase when the formal rules describing that system do not change?

In [22], a semantic code search method is described whose goal is to repair register machine programs. The method uses human-coded fragments in a database to repair buggy C programs, written by novice students. It has a 19 percent success rate on benchmarked bugs. It has no principle of self-modifiability. It has no methods or machines for self-repairing instructions.

The Active Element Machine

Active elements compute simultaneously. AEM instructions specify time, while standard compilers and language theory [29] do not specify time. In native hardware, an AEM can simultaneously execute 100,000 instructions or more, and eliminate the von Neumann bottleneck [30].

First, we provide a summary description of the AEM. Then a small AEM program is described that computes if a complete monochromatic graph on 3 vertices exists. Then we describe how self-modifiability can repair a program.

An AEM is composed of computational objects called active elements or elements. There are three kinds of elements: input, computational and output active elements. Input elements process information received from the environment or another AEM. Computational elements receive pulses from the input elements and other computational elements and transmit new pulses to computational and output active elements. Output elements receive pulses from input and computational elements. Every element is active in the sense that each one can receive and transmit pulses simultaneously.

Each pulse has an amplitude and a width. The width represents how long the amplitude lasts as input to the element that receives the pulse. If element $E_i$ simultaneously receives pulses with amplitudes summing to a value greater than $E_i$'s threshold and $E_i$'s refractory period has expired, then $E_i$ fires. When $E_i$ fires, it sends pulses to other elements. If $E_i$ fires at time t, a pulse reaches element $E_k$ at time $t+\tau_{ik}$ where $\tau_{ik}$ is the delay (transmission time) from $E_i$ to $E_k$.

In the section titled "Active Element Machine Language", a specification of the AEM language defines four instructions and two keywords. An element instruction creates a new active element or updates an element's parameters: (element (time 2) (name L) (threshold −3) (refractory 2) (last 0)). In input element instructions, parameters threshold, refractory and last may be omitted.

At time t=2, if element L does not exist, then L is created. Element L's threshold is set to −3. L's refractory period is set to 2, and L's last time fired is set to 0. After time t=2, element L exists indefinitely with the same threshold and refractory values until a new element instruction with name value L executes at a later time.

A connection instruction connects two elements: (connection (time 2) (from C) (to L) (amp −7) (width 6) (delay 3)). At time t=2, a connection from element C to element L is created. The pulse amplitude is set to −7. The pulse width is set to 6. The transmission time is set to 3.

A fire instruction fires an input element and sends input, by transmitting pulses to other active elements: (fire (time 3) (name C)) fires element C at t=3.

In (name v), value v uniquely identifies the active element in element and fire instructions. In expression (from v) (to w), values v and w uniquely identify a connection: (connection (time 2) (from v) (to w) (amp 7) (width 6) (delay 3)).

A meta instruction can self-modify an AEM program: (meta (name E) (window 1 5) (C (args a b))). If element E fires (a dynamical event) during the time window [1, 5], this meta instruction executes and creates instruction C with arguments a and b.

Suppose an element instruction is contained in a meta instruction and an element instruction with the same name value already exists in the AEM program. If the meta instruction executes, then the element instruction in the meta instruction replaces the one in the AEM program. A similar replacement occurs for fire instructions if the name values are the same. A similar replacement occurs for a connection instruction in a meta instruction if the from and to values are the same.

Keyword dT represents an infinitesimal [31] amount of time that helps coordinate almost simultaneous events. dT<q for every rational q>0, and dT>0.

A Simple AEM Program

We define a program with 4 input active elements A, B, C, and D and one computational element E.

```
(element (time −dT) (name E) (threshold 9) (refractory 4) (last 0) )
(element (time −dT) (name A))
(element (time −dT) (name B))
(element (time −dT) (name C))
(element (time −dT) (name D))
(connection (time −1) (from A) (to E) (amp 5) (width 4+2dT)
(delay 3−dT))
(connection (time −1) (from B) (to E) (amp 9) (width 6)
(delay 2+dT))
(connection (time −1) (from C) (to E) (amp −4) (width 5)
(delay 5−dT))
(connection (time −1) (from D) (to E) (amp 2) (width 4+2dT)
(delay 6−dT))
(fire (time 0) (name A)) (fire (time 0) (name B))
(fire (time 0) (name C)) (fire (time 0) (name D))
(fire (time 0) (name E))
```

The fire instructions cause elements A, B, C, D and E to fire at t=0. The parameters of the elements and their connections are shown in tables 1 and 2.

TABLE 1

| Element Parameter Values | | | |
|---|---|---|---|
| element | threshold | refractory | last firing time |
| E | 9 | 4 | 0 |

9

TABLE 2

| | | Connection Parameter Values | | | |
|---|---|---|---|---|---|
| name | from | to | amplitude | width | delay |
| AE | A | E | 5 | 4 + 2dT | 3 − dT |
| BE | B | E | 9 | 6 | 2 + dT |
| CE | C | E | −4 | 5 | 5 − dT |
| DE | D | E | 2 | 4 + 2dT | 6 − dT |

Figure 6:
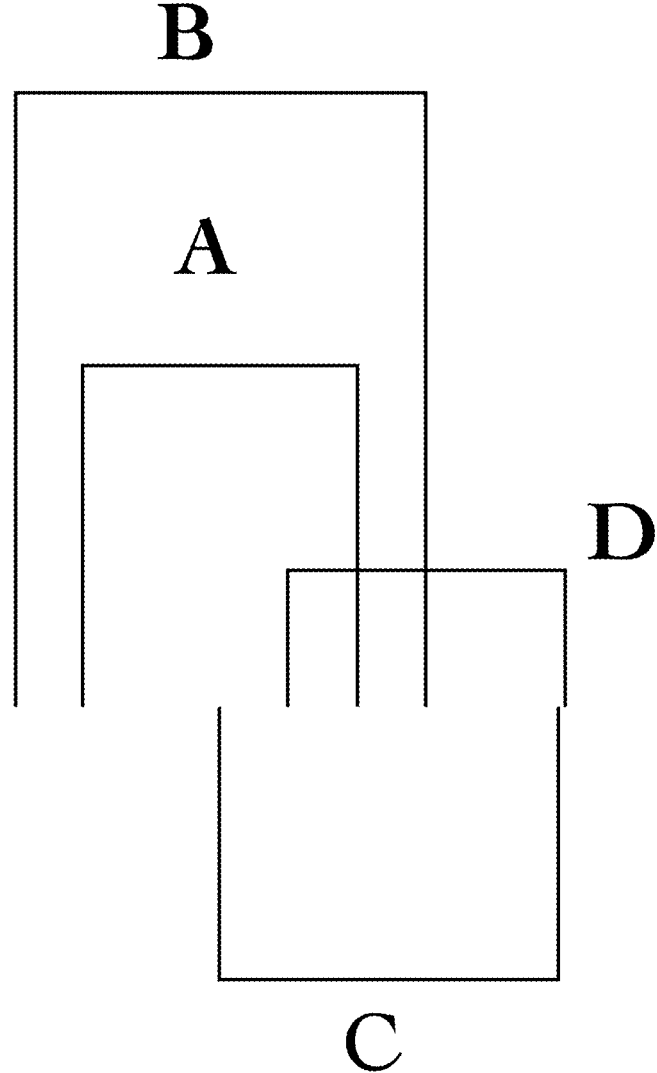
FIG. 6 shows an example of the active element computing machine sending four pulses to element E. One pulse is sent from element A to E. One pulse is sent from element B to E. One pulse is sent from element C to E. One pulse is sent from element D to E.

FIG. 6 shows the resulting pulses sent from input elements A, B, C, D to element E. The pulse sent from element B reaches element E at time 2+dT. The pulse sent from A reaches E at time 3−dT. FIG. 6 also shows a time geometry of the pulses sent to element E.

FIG. 7 shows the sum of the pulses received by E at various times. At time t=3, E does not fire because E's refractory period is 4 and the last time E fired was t=0. At t=4, E fires because the sum of E's input is 14 and 14 is greater than E's threshold of 9. Since E fires at t=4, E cannot fire again until t=8 or afterward. At time t=8, the sum of E's input is 7, and 7 is less than E's threshold. Hence, E does not fire a second time.

An AEM that Computes Colorings of $K_5$

We describe an AEM program that computes a simple graph theory problem. In the section titled "An Active Element Machine Method that Self-Repairs", we describe the use of meta instructions to repair instructions that have been removed from a valid AEM program.

Figure 5:
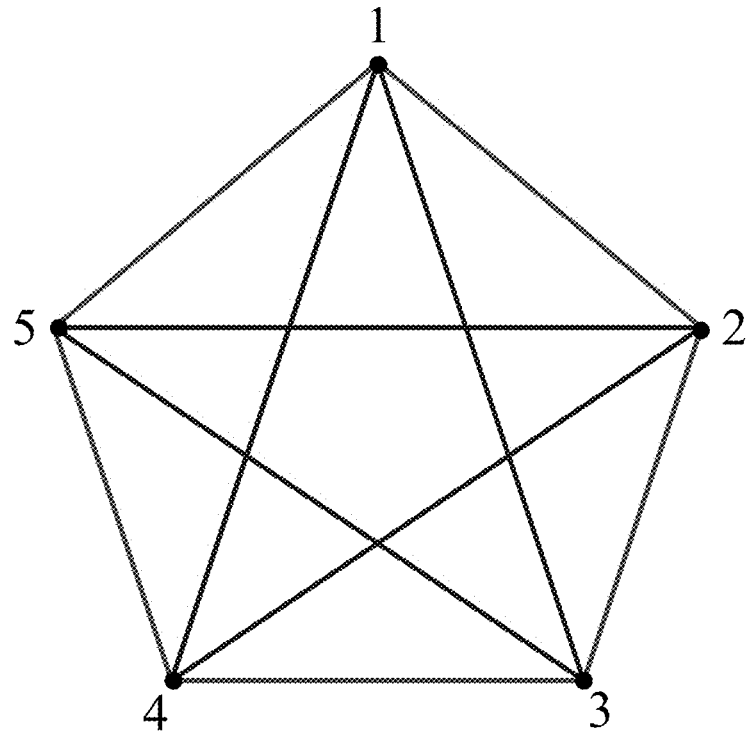
FIG. 5 shows a complete graph, called $K_5$, on 5 vertices, where each edge is colored red or blue.

$K_5$ is the complete graph on 5 vertices, $\{1, 2, 3, 4, 5\}$. In FIG. 5, each edge $\{j, k\}$ is colored red or blue. The red edges are $\{1, 2\}$, $\{2, 3\}$, $\{3, 4\}$, $\{4, 5\}$, and $\{1, 5\}$. The blue edges are $\{1, 3\}$, $\{1, 4\}$, $\{2, 4\}$, $\{2, 5\}$, and $\{3, 5\}$.

We specify an AEM program that determines whether a coloring of $K_5$ contains a complete monochromatic subgraph on 3 vertices (triangle). Monochromatic means the subgraph has only blue edges or only red edges. In FIG. 5, the coloring does not contain a monochromatic subgraph on 3 vertices.

This graph problem comes from Ramsey theory [32], which has extensive applications [33] in computer science, ergodic theory, information theory, logic, and number theory. Ramsey number $r(j, l)$ is the least integer n such that if the edges of the complete graph $K_n$ are colored with only red and blue, then there always exists a complete subgraph $K_j$ containing only red edges or there exists a complete subgraph $K_l$ with only blue edges. Computing $r(j, l)$ is an NP-hard problem [34]. $r(j, l)$ grows so fast that $r(5, 5)$ is unknown.

Below are 5 red edge input element instructions. The one named R12 represents that edge $\{1, 2\}$ is red.

```
(element (time 0) (name R12) (threshold 1) (refractory 1) (last −1))
(element (time 0) (name R23) (threshold 1) (refractory 1) (last −1))
(element (time 0) (name R34) (threshold 1) (refractory 1) (last −1))
(element (time 0) (name R45) (threshold 1) (refractory 1) (last −1))
(element (time 0) (name R15) (threshold 1) (refractory 1) (last −1))
```

Below are 5 blue edge input element instructions, where Bij ranges over $\{B13, B14, B24, B25, B35\}$.

```
(element (time 0) (name Bij) (threshold 1) (refractory 1) (last −1))
```

10

Below are 5 instructions that fire the red edge elements, and 5 instructions that fire the blue edge elements.

```
(fire (time 0) (name R12)) (fire (time 0) (name R23))
(fire (time 0) (name R34)) (fire (time 0) (name R45))
(fire (time 0) (name R15)) (fire (time 0) (name B13))
(fire (time 0) (name B14)) (fire (time 0) (name B24))
(fire (time 0) (name B25)) (fire (time 0) (name B35))
```

For each red edge $\{j, k\}$, there is a meta instruction

```
(meta (name Rjk) (window 0 1)
    (connection (time 0) (from Rjk) (to Rjk) (amp 2) (width 1) (delay 1)))
``` where Rjk is one of R12, R23, R34, R45, R15.
For each blue edge $\{j, k\}$, there is a meta instruction

```
(meta (name Bjk) (window 0 1)
    (connection (time 0) (from Bjk) (to Bjk) (amp 2) (width 1) (delay 1)))
``` where Bjk is one of B13, B14, B24, B25, B35.
For each 3 distinct vertices $\{i, j, k\}$ in $\{1, 2, 3, 4, 5\}$, create red element R_ijk and blue element B_ijk.

```
(element (time 0) (name R_ijk) (threshold 5) (refractory 1) (last -1))
(element (time 0) (name B_ijk) (threshold 5) (refractory 1) (last -1))
```

For each set of 3 distinct vertices $\{i, j, k\}$, compute if all three edges $\{i, j\}$, $\{i, k\}$, $\{j, k\}$ are blue.

```
(connection (time 0) (from Bij) (to B_ijk) (amp 2) (width 1) (delay 1) )
(connection (time 0) (from Bjk) (to B_ijk) (amp 2) (width 1) (delay 1) )
(connection (time 0) (from Bik) (to B_ijk) (amp 2) (width 1) (delay 1) )
```

For each set of three distinct vertices $\{i, j, k\}$, compute if all three edges $\{i, j\}$, $\{i, k\}$, $\{j, k\}$ are red.

```
(connection (time 0) (from Rij) (to R_ijk) (amp 2) (width 1) (delay 1) )
(connection (time 0) (from Rjk) (to R_ijk) (amp 2) (width 1) (delay 1) )
(connection (time 0) (from Rik) (to R_ijk) (amp 2) (width 1) (delay 1) )
```

An Active Element Machine Method that Self-Repairs

We built a software tool that simulates the active element machine. We compiled our C code [35] to a dynamic library (59,552 bytes), named AEM.dylib. Library AEM.dylib runs on macOS Big Sur, and can execute all four AEM instructions.

The AEM can simultaneously execute multiple instructions, while C code compiles to register machine instructions that can only execute sequentially. By finessing the use of dT in our AEM programs, we can avoid simulations that produce different computing results than an actual AEM program, implemented in hardware, would produce. Before demonstrating self-repair, we describe two software simulations of our AEM program defined in the previous section.

During the first simulation, the following firing activity occurs. At time 0, elements B13, B14, B24 B25, B35, R12, R15, R23, R34, and R45 fire. None of the elements B_ijk or R_ijk ever fire: thus, $K_5$'s coloring does not contain a blue or red triangle.

If $\{3, 5\}$ is colored red instead of blue, instruction (fire (time 0) (name R35)) replaces (fire (time 0) (name B35)).

Also, (element (time 0) (name R35) (threshold 1) (refractory 1) (last −1)) replaces (element (time 0) (name B35) (threshold 1) (refractory 1) (last −1)).

During the second simulation, the new AEM program produces the following firing activity. At time t=0, elements B13, B14, B25, B24, R12, R15 R23, R34, R35 and R45 fire. Also, element R_345 fires at t=1: This means that the new coloring of $K_5$ has a red triangle {3, 4, 5}.

Now we show how the new AEM program can be protected. Suppose the new AEM program is sabotaged by removing the connection instruction:

---

(connection (time 0) (from R35) (to R_345) (amp 2) (width 1) (delay 1) )

---

When element R35 fires, the pulse of amplitude 2 is not sent to R_345 and the input sum to R_345 never goes above 4, so R_345 never fires even though the new coloring of $K_5$ contains the red triangle {3, 4, 5}.

We can heal the removal of this connection with the following meta instruction:

---

(meta (name R35) (window −dT 1)
   (connection (time 0) (from R35) (to R_345) (amp 2) (width 1)
   (delay 1) )

---

Similarly, for each connection from Rij to R_ijk, we can heal the removal with the meta instruction:

---

(meta (name Rij) (window −dT 1)
  (connection (time 0) (from Rij) (to R_ijk) (amp 2) (width 1) (delay 1) )

---

We can add a similar meta instruction for each connection from Rjk to R_ijk and for each connection from Rik to R_ijk. We can also protect the blue connections by adding a meta instruction for each connection from Bij to B_ijk.

---

(meta (name Bij) (window −dT 1)
  (connection (time 0) (from Bij) (to B_ijk) (amp 2) (width 1) (delay 1) )

---

We can add a similar meta instruction to heal broken connections for each connection from Bjk to B_ijk and for each connection from Bik to B_ijk.

Active Element Machine Architecture

Let $\mathbb{Z}$ be the integers, and fix infinitesimal dT [31]. Define extended integers $\overline{\mathbb{Z}} =$ {m+k dT: m, k∈ $\mathbb{Z}$}. In, keyword dT is described, which establishes an order on $\overline{\mathbb{Z}}$ : for example, 3−5dT<3−4dT.

Definition 1. Machine Architecture $\Gamma$, $\Omega$, and $\Delta$ are index sets that index the input, computational, and output active elements, respectively. Intersections $\Gamma \cap \Omega$ and $\Omega \cap \Delta$ can be empty or non-empty. A machine architecture, denoted as $\mathcal{M}(\mathcal{I}, \mathcal{E}, \mathcal{O})$, consists of a collection of input active elements, denoted as $\mathcal{I} =$ {$E_i$: i∈$\Gamma$}; a collection of computational active elements $\mathcal{E} =$ {$E_i$: i∈$\Omega$}; and a collection of output active elements $\mathcal{O} =$ {$E_i$: i∈$\Delta$}.

Each computational and output active element, $E_i$, has the following components and properties:

A threshold $\theta_i$

A refractory period $r_i$ where $r_i > 0$.

A collection of pulse amplitudes {$A_{ki}$: k∈$\Gamma \cup \Omega$}.

A collection of transmission times {$\tau_{ki}$: k∈$\Gamma \cup \Omega$}, where $\tau_{ki} > 0$ for all k∈$\Gamma \cup \Omega$.

A function of time, $\Psi_i(t)$, representing the time active element $E_i$ last fired. $\Psi_i(t)=\sup\{s: s<t$ and $g_i(s)=1\}$, where $g_i(s)$ is the output function of active element $E_i$ and is defined below. The sup is the least upper bound and is always defined here, whence $\Psi_i$ is well-defined.

A binary output function, $g_i(t)$, representing whether active element $E_i$ fires at time t. The value of $g_i(t)=1$ if $\Sigma A_{ki}(t) > \theta_i$ where the sum ranges over all k∈$\Gamma \cup \Omega$ and $t \le \Psi_i(t)+r_i$. In all other cases, $g_i(t)=0$. For example, $g_i(t)=0$, if $t<\Psi_i(t)+r_i$.

A set of firing times of active element $E_k$ within active element $E_i$'s integrating window, $W_{ki}(t)=$ {s: active element $E_k$ fired at time s and $0 \le t-s-\tau_{ki} < \omega_{ki}$}. Let $|W_{ki}(t)|$ denote the number of elements in the set $W_{ki}(t)$. If $W_{ki}(t)=\emptyset$, then $|W_{ki}(t)|=0$.

A collection of input functions, {$\phi_{ki}$: k∈$\Gamma \cup \Omega$}, each a function of time, and each representing pulses coming from computational active elements, and input active elements. The value of the input function is computed as $\phi_{ki}(t)=|W_{ki}(t)|A_{ki}(t)$.

The refractory periods, pulse amplitudes and thresholds are integer valued. At any moment, transmission times and pulse widths are extended integers≥1. These parameters are a function of time: $\theta_i(t)$, $r_i(t)$, $A_{ki}(t)$, $\omega_{ki}(t)$, $\tau_{ki}(t)$. Time t is an extended integer.

Input active elements that are not computational have the same properties as computational elements, except they receive no inputs $\phi_{ki}$ from elements in this machine. Input elements are externally firable, by an external source from the environment or an output element from a distinct machine $\mathcal{M}(\mathcal{I'}, \mathcal{E'}, \mathcal{O'})$. An input element can fire at any time after its refractory period has expired. An element can be an input and computational element; an element can be an output and computational element. When an output element $E_i$ is not a computational element (i∈$\Delta$−$\Omega$), then $E_i$ does not send pulses to elements in this machine.

If $g_i(s)=1$, then active element $E_i$ fired at time s. Refractory period $r_i$ is the amount of time that must elapse after $E_i$ just fired before $E_i$ can fire again. $\tau_{ki}$ is the transmission time: If element $E_k$ fires at time t, a pulse sent from $E_k$ reaches $E_i$ at time $t+\tau_{ki}$. Pulse amplitude $A_{ki}$ is the height of the pulse that $E_k$ sends to $E_i$ after $E_k$ has fired. After this pulse reaches $E_i$, pulse width $\omega_{ki}$ indicates how long the pulse lasts as input to $E_i$. If $A_{ki}=0$, no connection exists from $E_k$ to $E_i$.

Active Element Machine Language

A minimal programming language defines four instructions: element, connection, fire, and meta.

Machine-Implemented Method 1. AEM Program

An AEM program is defined with Backus-Naur syntax. $\epsilon$ indicates a blank string that terminates an expression.

---

```
<AEM_program> : := <aem_cmds>
<aem_cmds> : := ε | <cmd><aem_cmds>
<cmd> : : = <e_cmd> | <c_cmd> | <f_cmd> | <m_cmd>
```

Machine-Implemented Method 2. AEM Symbols & Extended Integers

```
<ename> : := <int> | <symbol>
<symbol> : := <char><str> | (<ename> . . . <ename>)
<str> : := ϵ | <char><str> | 0<str> | <pint><str>
<char> : := <letter> | <special_char>
<letter> : := <lower_case> | <upper_case>
<lower_case> : := a | b | c | d | e | f | g | h | i | j | k | l | m |
          n | o | p | q | r | s | t | u | v | w | x | y | z
<upper_case> : := A | B | C | D | E | F | G | H | I | J | K | L | M |
          N | O | P | Q | R | S | T | U | V | W | X | Y | Z
<special_char> : := _
```

The rules below cover extended integer arithmetic.

```
<int> : := <pint> | <nint> | 0
<nint> : := – <pint>
<pint> : : = <nonzero><digits>
<digits> : := <numeral> | <numeral><digits>
<nonzero> : := 1 | 2 | 3 | 4 | 5 | 6 | 7 | 8 | 9
<numeral> : : = ϵ | <nonzero> | 0
<aint> : := <aint><sgn><d> | <d><sgn><aint> | <d>
<sgn> : : = + | –
<d> : : = <int> | <char><str> | <infinitesimal>
<infinitesimal> : : = dT
```

Machine Instruction 3. Element

An element instruction specifies the time when an active element is created or its parameter values are updated. Its Backus-Naur syntax is shown below.

```
<e_cmd> : := (element (time <aint>) (name <ename>) <eth> <ere> <ela>)
eth : := ϵ | (threshold <int>)
ere : := ϵ | (refractory <pint>)
ela : := ϵ | (last <int>)
```

Keyword time tags a time value s (extended integer) when the element is created or updated. If the name value is E, keyword name tags name E of the active element. Keyword threshold tags a threshold $\theta_E(s)$. Keyword refractory tags a refractory value $r_E(s)$, and last tags a last time fired value $\Psi_E(s)$.

Machine Instruction 4. Connection

A connection instruction creates or updates a connection from one active element to another active element. Its Backus-Naur syntax is shown below.

```
<c_cmd> : := (connection (time <aint>) (from <ename>) (to <ename>)
          [(amp <int>) (width <pint>) (delay <pint>)])
```

Keyword time tags a time value s when the connection is created or updated. Keyword from tags a name E of the active element that sends a pulse with these updated values. Keyword to tags a name B of the active element that receives a pulse with these updated values. Keyword amp tags a pulse amplitude value $A_{E,B}(s)$ that is assigned to this connection. Keyword width tags a pulse width value $\omega_{E,B}(s)$. Keyword delay tags a transmission time $\tau_{E,B}(s)$.

When the AEM clock reaches time s, symbols E and B are name values that must refer to an element that already has been created or updated before or at time s. Not all of the connection parameters have to be in a connection instruction. If the connection does not exist beforehand and the width and delay values are not specified appropriately, then the amplitude is set to 0: this "zero" connection has no effect on the AEM computation. The connection exists indefinitely with the same parameter values until a new connection instruction is executed between from element E and to element B.

Machine Instruction 5. Fire

A fire instruction has the following syntax. <f_cmd>::= (fire (time <aint>) (name <ename>)) The fire instruction fires the active element indicated by the name tag at the time indicated by the time tag. This instruction can be used to fire input active elements.

Machine Keyword 6. dT

Keyword dT represents a positive infinitesimal amount of time. If m and n are integers and $0 \le m < n$, then $mdT < ndT$. Also, $dT > 0$ and dT is less than every positive rational number; and $-dT < 0$ and $-dT$ is greater than every negative rational number.

dT coordinates almost simultaneous events that are non-commutative or indeterminate: e.g. element A may be receiving a pulse from element B at the same time that a connection between them is removed.

Machine Keyword 7. clock

Keyword clock evaluates to an integer, and is the current AEM time. clock is an instance of <ename>.

If the current AEM time is 5, then (element (time clock) (name clock) (threshold 1) (refractory 1) (last –1)) executes as (element (time 5) (name 5) (threshold 1) (refractory 1) (last –1)).

After (element (time clock) (name clock)

(threshold 1) (refractory 1) (last –1)) is created, then this instruction is executed with the current clock time. If this instruction is in the original AEM program before the clock starts at 0, then the following sequence of elements named 0, 1, 2, . . . are created.

```
(element (time 0) (name 0) (threshold 1) (refractory 1) (last –1))
(element (time 1) (name 1) (threshold 1) (refractory 1) (last –1))
(element (time 2) (name 2) (threshold 1) (refractory 1) (last –1))
. . .
```

Machine Instruction 8. Meta

A meta instruction executes an instruction <cmd> when an active element fires within a window of time.

```
<m_cmd> : := (meta (name <ename>) [<wtime>] <cmd>)
<wtime> : := (window <aint> <aint>)
```

For example, E is the name of the active element in (meta (name E) (window 1 w) (C (args t a)). Keyword window tags a time interval, called a window of time. 1 and w are extended integers that locate the boundary points. If w>0, the window of time is [1, 1+w]. If w<0, the window is [1+w, 1].

Instruction C executes each time that E fires during the window of time. If the window is omitted, then instruction C executes at any time that element E fires. If the instruction C is a connection instruction and the connection values are zero or omitted and the (from E1) (to E2) in the connection instruction match with elements E1 and E2 already exists in the machine, then the connection from E1 to E2 is deleted (removed).

If the instruction C is an element instruction and the element (name E) already exists in the machine and the threshold expression is omitted or the refractory expression is 0 (refractory 0) or omitted, then the element E is removed (deleted) from the active element machine and all connections to or from E are removed from the active element machine.

One-Way Hash Function

A one-way hash function $\Phi$, has the property that given an output value z, it is computationally intractable to find an information element $m_z$ such that $\Phi(m_z)=z$. In other words, a one-way function $\Phi$ is a function that can be easily computed, but that its inverse $\Phi^{-1}$ is computationally intractable to compute [45]. A computation that takes $10^{101}$ computational steps is considered to have computational intractability of $10^{101}$.

More details are provided on computationally intractable. In an embodiment, there is an amount of time T that encrypted information must stay secret. If encrypted information has no economic value or strategic value after time T, then computationally intractable means that the number of computational steps required by all the world's computing power will take more time to compute than time T. Let C(t) denote all the world's computing power at the time t in years.

Consider an online bank transaction that encrypts the transaction details of that transaction. Then in most embodiments, the number of computational steps that can be computed by all the world's computers for the next 30 years is in many embodiments likely to be computationally intractable as that particular bank account is likely to no longer exist in 30 years or have a very different authentication interface.

To make the numbers more concrete, the 2013 Chinese supercomputer that broke the world's computational speed record computes about 33,000 trillion calculations per second [46]. If T=1 one year and we can assume that there are at most 1 billion of these supercomputers. (This can be inferred from economic considerations, based on a far too low 1 million dollar price for each supercomputer. Then these 1 billion supercomputers would cost 1,000 trillion dollars.). Thus, C(2014)×1 year is less than $10^9 \times 33 \times 10^{15} \times 3600 \times 24 \times 365 = 1.04 \times 10^{33}$ computational steps.

As just discussed, in some embodiments and applications, computationally intractable may be measured in terms of how much the encrypted information is worth in economic value and what is the current cost of the computing power needed to decrypt that encrypted information. In other embodiments, economic computational intractability may be useless. For example, suppose a family wishes to keep their child's whereabouts unknown to violent kidnappers. Suppose T=100 years because it is about twice their expected lifetimes. Then 100 years×C(2064) is a better measure of computationally intractable for this application. In other words, for critical applications that are beyond an economic value, one should strive for a good estimate of the world's computing power.

One-way functions that exhibit completeness and a good avalanche effect or the strict avalanche criterion [47] are preferable embodiments: these properties are favorable for one-way hash functions. The definition of completeness and a good avalanche effect are quoted directly from [47]:

If a cryptographic transformation is complete, then each ciphertext bit must depend on all of the plaintext bits. Thus, if it were possible to find the simplest Boolean expression for each ciphertext bit in terms of plaintext bits, each of those expressions would have to contain all of the plaintext bits if the function was complete. Alternatively, if there is at least one pair of n-bit plaintext vectors X and $X_i$ that differ only in bit i, and f(X) and $f(X_i)$ differ at least in bit j for all $\{(i, j): 1 \le i, j \le n\}$, the function f must be complete.

For a given transformation to exhibit the avalanche effect, an average of one half of the output bits should change whenever a single input bit is complemented. In order to determine whether a m×n (m input bits and n output bits) function f satisfies this requirement, the $2^m$ plaintext vectors must be divided into $2^{m-1}$ pairs, X and $X_j$ such that X and $X_j$ differ only in bit i. Then the $2^{m-1}$ exclusive-or sums $V_i = f(X) \oplus f(X)$ must be calculated. These exclusive-or sums will be referred to as avalanche vectors, each of which contains n bits, or avalanche variables.

If this procedure is repeated for all i such that $1 \le i \le m$ and one half of the avalanche variables are equal to 1 for each i, then the function f has a good avalanche effect. Of course this method can be pursued only if m is fairly small; otherwise, the number of plaintext vectors becomes too large. If that is the case then the best that can be done is to take a random sample of plaintext vectors X, and for each value i calculate all avalanche vectors $V_i$. If approximately one half the resulting avalanche variables are equal to 1 for values of i, then we can conclude that the function has a good avalanche effect.

A hash function, also denoted as $\Phi$, is a function that accepts as its input argument an arbitrarily long string of bits (or bytes) and produces a fixed-size output of information. The information in the output is typically called a message digest or digital fingerprint. In other words, a hash function maps a variable length m of input information to a fixed-sized output, $\Phi(m)$, which is the message digest or information digest. Typical output sizes range from 160 to 512 bits, but can also be larger. An ideal hash function is a function $\Phi$, whose output is uniformly distributed in the following way: Suppose the output size of $\Phi$ is n bits. If the message m is chosen randomly, then for each of the $2^n$ possible outputs z, the probability that $\Phi(m)=z$ is $2^{-1}$. In an embodiment, the hash functions that are used are one-way.

A good one-way hash function is also collision resistant. A collision occurs when two distinct information elements are mapped by the one-way hash function $\Phi$ to the same digest. Collision resistant means it is computationally intractable for an adversary to find collisions: more precisely, it is computationally intractable to find two distinct information elements $m_1, m_2$ where $m_1 \ne m_2$ and such that $\Phi(m_1)=\Phi(m_2)$.

A number of one-way hash functions may be used to implement one-way hash function 148. In an embodiment, SHA-512 can implement one-way hash function 148, designed by the NSA and standardized by NIST [48]. The message digest size of SHA-512 is 512 bits. Other alternative hash functions are of the type that conform with the standard SHA-384, which produces a message digest size of 384 bits. SHA-1 has a message digest size of 160 bits. An embodiment of a one-way hash function 148 is Keccak [49]. An embodiment of a one-way hash function 148 is BLAKE [50]. An embodiment of a one-way hash function 148 is Grøstl [51]. An embodiment of a one-way hash function 148 is JH [52]. Another embodiment of a one-way hash function is Skein [53].

A Healing Machine-Implemented Method

A Turing computable property is a property that can be computed by a register machine. Since active element machine programs can execute Turing computable algorithms [27], the healing examples demonstrated in can be extended with more general methods. For example, a new output active element $O_c$ can be adjoined to an active element machine program for the sole purpose of detecting some Turing computable property c has changed in the damaged active element machine program. One can adjoin meta instructions of the form (meta (name $O_c$) h) where if active element $O_c$ fires, the firing of $O_c$ indicates that property c is awry. Hence, instruction h self-modifies the active element machine program so that adjoining instruction h at least partially heals the damaged active element machine program.

Before we provide a formal description, we give two examples of properties, named $\phi_1$ and $\phi_2$.

$\phi_1$: The number of non-zero connections in program P that contain expression (to A) is 7.

$\phi_2$: Suppose P is the active element machine defined in the section titled "A Simple AEM Program". If elements A, B, C, and D all fire at time s, then element E will fire before or at time s+4.

Let $\mathcal{P}$ denotes the set of all active element machine programs. A property of all programs $\mathcal{P}$ is defined as a characteristic function $\phi$: $\mathcal{P} \rightarrow \{0, 1\}$. When $\phi(P)=1$, then property $\phi$ holds on program P. If $\phi(P)=0$, then property $\phi$ is violated on P. $\phi$ is a Turing computable property if $\phi$ is Turing computable on $\mathcal{P}$. For a finite set of programs $\mathcal{F} \subset \mathcal{P}$, a restriction $\phi | \mathcal{F} : _{\mathcal{F}} F \rightarrow \{0, 1\}$ can be Turing computable, yet $\phi$ is not necessarily Turing computable on $\mathcal{P}$.

A subprogram S of an active element machine program P is any subset of instructions selected from P. An extension program of S is a finite set of active element machine instructions adjoined to S. Machine-implemented method 9 demonstrates healing capabilities of an active element machine program. Machine-implemented method 9 describes how program H heals a damaged (malfunctioning) program P.

Summary of Machine-Implemented Method 9

P is an active element machine program. $\phi$ is a Turing computable property (a property that can be computed by a digital computer algorithm) of program P. An active element machine subprogram S of P can compute whether property $\phi$ holds on program P or is violated. An extension active element machine program H of S can execute and restore program (heal) P if P is damaged and H is not damaged. Moreover, program S can verify that $\phi$ computes the same value on the original program P.

Method 9 starts with program S, and describes how to build program H that heals program P.

Machine-Implemented Method 9. Healing Machine-Implemented Method

STEP 0: Input: Program S and Program P

STEP 1: Add a new unique element with name value X (not in program P) to program S.

STEP 2: For each instruction C in P adjoin instruction (meta (name X) C) to program S.

STEP 3: Adjoin instruction (fire (time t0) (name X)) to program S. t0 is the time that program H loads and starts executing.

STEP 4: When X fires, meta instructions in program H repair instructions in program P that were adjoined to program S.

Comments on Machine-Implemented Method 9:

Name value X must not occur in P because any firing activity of X must not interfere with firing activity of other elements in P. $\phi$ has the same value on the restored program as the original program P.

Overall, machine-implemented method 9 is a general method for how instructions that self-modify the program can help repair a damaged program. Self-modifiable instructions play a fundamental role in healing a damaged program.

In some embodiments, a Turing computable property $\phi_i$ can be the the ith bit of a one-way hash function (described in the previous section) applied to program P that checks if tampering of P has occurred.

Self-Modifiable Differential Systems That Perform a Task

Before we show how to self-modify a differential equation, we describe some ordinary differential equations. Then we describe a machine-implementable formal language for building differential equations that are machine-implementable or circuit-implementable. Finally, we show a damaged one and illustrate how to heal it when it is part of a circuit.

ODEs that Compute Or, And, Not

We define ordinary differential equations that can compute the Boolean operator OR, where OR(1, 0)=OR(0, 1)=OR(1, 1)=1, and OR(0, 0)=0. Consider equations $$\frac{dx}{dt} = 0; \frac{dy}{dt} = 0; \text{ and } \frac{dz}{dt} = x + y - xy - z.$$

The initial values $x_0$ and $y_0$ are Boolean inputs 0 or 1. Variable z computes the output. z's initial value is always $z_0=0$. We tested that z converges to the correct Boolean output for all 4 pairs of initial values $x_0, y_0 \in \{0, 1\}$, using Julia [37]. For example, table 3 assumes initial conditions $x_0=0$; $y_0=1$; and $z_0=0$.

TABLE 3

| | $\frac{dx}{dt} = 0.$ | $\frac{dy}{dt} = 0.$ | $\frac{dz}{dt} = x + y - xy - z.$ | | | | |
|---|---|---|---|---|---|---|---|
| t | 0 | .25 | .49 | .81 | 1.22 | 2.34 | 3.07 | 4.0 |
| x(t) | 0 | 0 | 0 | 0 | 0 | 0 | 0 | 0 |
| y(t) | 1 | 1 | 1 | 1 | 1 | 1 | 1 | 1 |
| z(t) | 0 | .22 | .56 | .71 | .82 | .90 | .95 | .98 |

If $x_0=0$, $y_0=1$ and $z_0=0$, then $$\left. \frac{dz}{dt} \right|_{t=0} = 1$$

and $$\frac{dz}{dt} = 1 - z$$

when t>0. Thus, $$\frac{dz}{dt} > 0$$

when z<1, and $$\lim_{t \to \infty} z(t, x_0 = 0, y_0 = 1, z_0 = 0) = 1.$$

By symmetry, $$\lim_{t \to \infty} z(t, x_0 = 1, y_0 = 0, z_0 = 0) = 1.$$

Also, $$\lim_{t \to \infty} z(t, x_0 = 1, y_0 = 1, z_0 = 0) = 1.$$

Lastly, the relevant fixed points (x, y, z) of $$\frac{dx}{dt} = 0;$$

$$\frac{dy}{dt} = 0;$$

$$\frac{dz}{dt} = x + y - xy - z$$

are (0, 1, 1), (1, 0, 1), (0, 0, 0), (1, 1, 1), and have the same input-output values as OR. (The fixed points are all (x, y, z) such that $$\frac{dx}{dt} = \frac{dy}{dt} = \frac{dz}{dt} = 0,$$

e.g. (2, 2, 0). Sometimes fixed points are called equilibrium points.)

Equations $$\frac{dx}{dt} = 0,$$

$$\frac{dy}{dt} = 0;$$

$$\text{and } \frac{dz}{dt} = xy - z$$

compute AND(0, 0)=AND(1, 0)=AND(0, 1)=0, and AND(1, 1)=1. Relevant fixed points are (0, 1, 0), (1, 0, 0), (0, 0, 0), (1, 1, 1). With input x and output z, $$\frac{dx}{dt} = 0 \text{ and } \frac{dz}{dt} = 1 + xz - (x + z)$$

Compute NOT.

0.1 Generalizing Meta Instructions

In the AEM, the firing of an element in a meta instruction adds a new connection or new element, or replaces some of the parameters in an existing element or connection. When meta instructions create new elements and connections, these new computational objects are representable by one or more new variables. This is evident from the machine architecture definition in of the appendix. In short, we identify two advances (novelties) in our invention(s) over prior art that are critical to self-modifying a differential equation that is circuit-implementable and/or machine-implementable.

1. A formal language specifies how to self-modify a differential equation. Meta operators are formal objects that self-modify an equation.
2. A meta variable helps detect an event. A detectable event triggers an execution of a meta operator. A meta operator alone is not sufficient for defining self-modification. A self-modifiable dynamical system must also know at what time a meta operator executes.

Meta Variable Machines

We define a meta variable machine, a machine detectable event, and a meta execution time. Standard variables are variables that occur in an ordinary differential equation. In $$\frac{dz}{dt} = 1 + xz - (x + z),$$

x and z are standard variables. Define $\omega_1, \ldots \omega_n$ as meta variables. Define $x_1, \ldots, x_n$ as standard variables. (Machine variables can have type standard or type meta. In some embodiments, the type specifies an interpreter or compiler how to construct these machines or circuits) Each $f_i$ is a machine-implemented or circuit function.

$$\frac{d\omega_i}{dt} = f_i(x_1, \ldots, x_n)$$

is a meta equation that is machine-implemented or implemented in a circuit. In some embodiments, it is an electronic circuit.

Let X be a topological space (e.g., phase space), where derivatives can be defined. At any time t, a standard variable's value $x_i(t)$ and a meta variable's value $\omega_i(t)$ both lie in X. Let A be a Lebesgue measurable [38] subset of X. (Set A is measurable so that an integral is physically well-defined: that is, it can be implemented as machine method or a physical circuit.) A signed characteristic function on A is $\chi_A: X \to \{-1, 1\}$. If x is in A, then $\chi_A(x)=1$; if x is not in A, then $\chi_A(x)=-1$. X is the domain of $\chi_A$, and $\{-1, 1\}$ is the range. Let $\theta_\omega$ be a threshold. Composing $\chi_A$ and meta variable $\omega$, a machine detectable event occurs when $$\int_{t=0}^{t=s} \chi_A(\omega(t)) \, dt \geq \theta_\omega, \text{ for some time } s. \tag{0.1}$$

In embodiments, when quantum events or quantum phenomena or other complex physical properties are used to build a machine or circuit, a more general description of a detectable event is described. In quantum mechanics, the following provides a physical description of quantum wave behavior:

$$i\hbar \frac{\partial \Psi(x, t)}{\partial t} = \left[ -\frac{\hbar^2}{2m} \frac{\partial^2}{\partial x^2} + V(x, t) \right] \Psi(x, t) \tag{0.2}$$

Let f: $X \times X \times [0, \infty) \to X$ be a machine-implemented or circuit implemented function, where f's first argument is $\omega(t)$; f's second argument is $d\omega/dt$; and its third argument is t. Call $C \subseteq X$ a detectable region in phase space. A physically detectable event in phase space occurs if $$\int_{t=0}^{t=s} f\left(\omega(t), \frac{d\omega}{dt}, t\right) \, dt \text{ lies in region } C \text{ at time } s. \tag{0.3}$$

Define meta operator execution time $\tau_\omega$ as the infimum of all times s that satisfy inequality 0.1 or phase space condition 0.3. (The infimum of a set of real numbers is the greatest lower bound.) A meta operator $\mathcal{M}_\omega$ machine, bound to meta variable $\omega$, executes at time $\tau_\omega$. (In inequality 0.1, integrating $\omega(t)$'s orbit and executing $\mathcal{M}_\omega$ is physically analogous to a meta instruction executing when an active element A fires, due to the sum of A's input pulses exceeding A's threshold.)

Meta Operator Machines & Circuits

Meta operator machines enable us to build self-modifiable differential equations that can specify self-modifiable circuits. Meta operator machines or circuits execute or machine-implement self-repair of a machine or healing system or circuit that is malfunctioning. A system of differential equations is a set of differential equations. For example, $$S = \left\{ \frac{dx}{dt} = 0, \ \frac{dy}{dt} = 0, \ \frac{dz}{dt} = x + y - xy - z \right\}$$

is a system.

Our formal language for meta operator machines works as follows. A create operator machine $\mathcal{C}$ creates an empty system, and assigns a name with syntax $\mathcal{C}$ (time, name). $\mathcal{C}$ (0, $S$) creates an empty system $S = \{ \ \}$ at time 0.

An initialize operator machine $\mathcal{I}$ declares a variable with a name and its type; assigns an initial value; and places the variable in a system. $\mathcal{I}$ 's syntax is $\mathcal{I}$ (time, variable_name, variable_type, initial_value, system_name). For example, $\mathcal{I}$ (0, x, standard, 0, $S$) creates x at time 0; defines x as a standard variable; and assigns x the initial value of 0 (i.e., $x_0 = 0$). Argument $S$ indicates that x is a variable in a system named $S$.

An adjoin operator machine $\mathcal{A}$ adjoins a new differential equation to a system. $\mathcal{A}$ 's syntax is $\mathcal{A}$ (time, equation, system_name). $\mathcal{A}$ is executed at a time specified by the first argument. In simpler cases, the time is explicitly stated. In other cases, the time is the greatest lower bound of all times s which satisfy integral inequality 0.1 or 0.3 in the section, titled "Meta Variables". For example, execute 7 meta operators shown below:

$$C(-1, S)$$

$$\mathcal{I}(0, x, \text{standard}, 0, S)$$

$$\mathcal{A}\left(0, \frac{dx}{dt} = 0, S\right)$$

$$\mathcal{I}(0, y, \text{standard}, 0, S)$$

$$\mathcal{A}\left(0, \frac{dy}{dt} = 0, S\right)$$

$$\mathcal{I}(0, z, \text{standard}, 0, S)$$

$$\mathcal{A}\left(0, \frac{dz}{dt} = x + y - xy - z, S\right).$$

Afterward, system $$S = \left\{ \frac{dx}{dt} = 0, \ \frac{dy}{dt} = 0, \ \frac{dz}{dt} = x + y - xy - z \right\}.$$

A replace operator machine $\mathcal{R}$ replaces a variable with an equation or variable, or $\mathcal{R}$ replaces an equation with another equation. $\mathcal{R}$ 's syntax is $\mathcal{R}$ (time, old_exp, new_exp, grammar, system_name). The argument time behaves the same as time in the adjoin operator. Sometimes the 2nd argument old_exp represents the current variable that will be replaced by a new variable or equation, indicated by the 3rd argument new_exp. Sometimes old_exp represents an equation that will be replaced by a new equation new_exp. The 4th argument grammar is a pattern matching scheme. For replacement to occur, an expression in old_exp, must be accepted by a grammar, specified in grammar. It may be a semi-Thue grammar [39]. (Also, see pages 220-223 in [29] that describes these grammars.) If grammar is $\emptyset$ or omitted, a replacement occurs at time specified by time. Overall, $\mathcal{R}$ plays a similar role to a meta instruction in an AEM.

Variable Spaces

Meta operator machines or circuits can remove and add variables to equations that machine-implement or circuit-implement self-modifiability. Variables spaces specify how meta operator machines or circuits add new variables or remove variables. Variable spaces are useful when they create a new variable, by measuring a quantum random event [40], which can help self-modifiable differential equations evolve and increase their complexity as time proceeds. This complexity property provides advantages in machine learning applications of self-modifiability.

Let $\mathbb{N}$, $\mathbb{R}$ and $\mathbb{R}^{\geq 0}$ be the counting, real numbers and non-negative reals, respectively. Define variable space $V = \{u_1, u_2, \ldots, u_n, \ldots\}$ in order to add a new standard variable $u_i$ to a differential equation. Define dual variable space $\overline{V} = \{\overline{u}_i : i \in \mathbb{N}\}$ to remove an existing standard variable $u_i$ in V from an equation. $\lambda$ is the empty variable.[1] Set $\mathcal{W} = \{\lambda\} \cup V \cup \overline{V}$.

[1] $\lambda$ is an analog of empty string $\epsilon$ in formal language theory [29].

Define a variable operator $\Phi$: $\mathbb{R}^{\geq 0} \to \mathcal{W}$ that adds or removes variables from a self-modifiable dynamical system $S$. If $\Phi(t_i) = u_i$, then meta operator $\mathcal{I}$ ($t_i$, $\Phi(t_i)$, standard, 0, $S$) adds standard variable $u_i$ to system $S$ if $u_i$ doesn't already exist in $S$. For our purposes, a system is a set of ordinary or partial differential equations. For some systems that represent an appropriate physical system or circuit, a restriction can be placed on $\Phi$: e.g., $\{r \in \mathbb{R}^{\geq 0}: \Phi(r) \in V \cup \overline{V}\}$ is countable.

Repairing a Machine or Circuit Implemented Equation

Adding a small amount of noise to the OR ODE so that $$\frac{dx}{dt} = 0.1 \text{ and } \frac{dy}{dt} = 0.1,$$

a Julia simulation is shown in table 4 with initial values $x_0 = y_0 = 0$. Table 4 shows that z moves to an incorrect output value because x and y move away from their initial values $x_0 = y_0 = 0$.

TABLE 4

|   | $\frac{dx}{dt} = 0.1$. | $\frac{dy}{dt} = 0.1$. | $\frac{dz}{dt} = x + y - xy - z$. |   |   |   |
| --- | --- | --- | --- | --- | --- | --- |
| t | 0 | .86 | 1.72 | 3.11 | 5.43 | 8.12 | 10.0 |
| x(t) | 0 | .086 | .17 | .31 | .54 | .81 | 1.0 |
| y(t) | 0 | .086 | .17 | .31 | .54 | .81 | 1.0 |
| z(t) | 0 | .055 | .17 | .38 | .68 | .91 | .98 |

Define circuit-implemented equation $$\frac{d\omega}{dt} = \frac{dx}{dt}$$

with meta variable $\omega$. Set $A=\mathbb{R}$. Set initial value $\omega(0)=0$. Then $$\int_0^s \chi_A(\omega(t))\,dt = \int_0^s \omega(t)\,dt.$$

Also, $$\omega(s) = \omega(0) + \int_0^s \frac{d\omega}{dt}\,dt = \int_0^s \frac{dx}{dt}\,dt.$$

Now $$\int_0^s \chi_A(\omega(t))\,dt = \int_0^s \int_0^s \frac{dx}{dt}\,dt.$$

Set $\theta_\omega = 10^{-6}$. Define $$R_\omega\!\left(\inf_{s>0}\int_0^s \omega(t)dt \geq \theta_\omega,\ \frac{dx}{dt}=0,\ \frac{dx}{dt}=x(1-x),\ \emptyset,\ S\right).$$

If there is physical noise $$\frac{dx}{dt} = \delta > 0,$$

noise accumulates so that $$\int_0^s \omega(t)\,dt$$

first $\theta_\omega$ at time $s$. At time $s$, $R_\omega$ self modifies to $$S = \left\{ \frac{dx}{dt} = x(1-x),\ \frac{dy}{dt}=0,\ \frac{dz}{dt}=x+y-xy-z \right\}.$$

This change repairs noise in circuit-implemented equation $dx/dt$ near $x=0$.

$R_\omega$ will not repair noise near $x=1$. One can repair noise around both $x_0=0$ and $x_0=1$, by splitting $A$, for some $\epsilon>0$, into $A_0=(-\epsilon, \epsilon)$ and $A_1=(1-\epsilon, 1+\epsilon)$, and creating two replacement operators $R_{\omega_0}$ and $R_{\omega_1}$.

A D Flip Flop Gate

Figure 8:
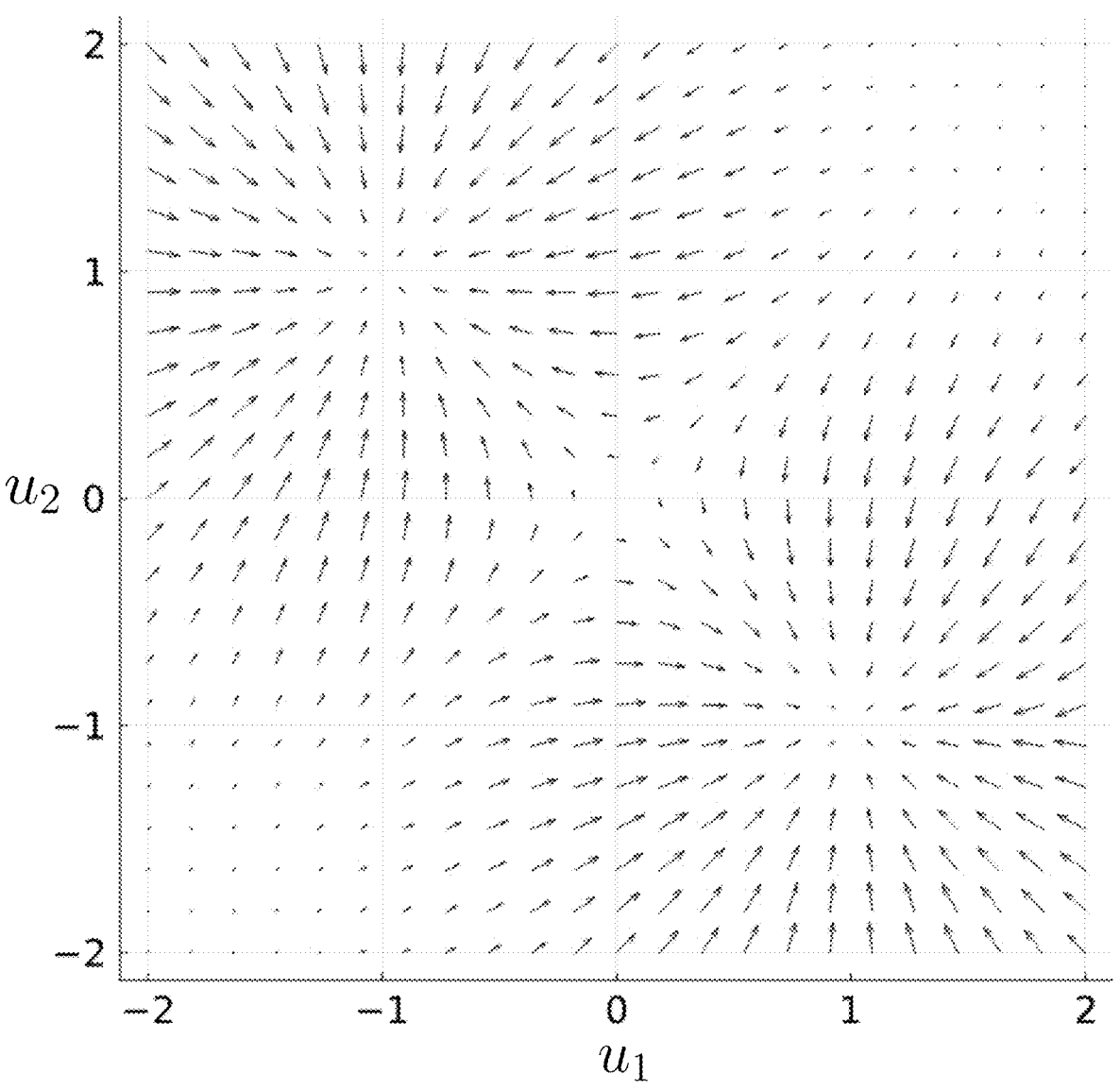
FIG. 8 shows an embodiment of a flip-flop vector field. In some embodiments, each vector corresponds to a voltage value in the flip-flop.

A D flip-flop gate model [14, 15] is our starting point from which we describe and substantially enhance in order to build our invention(s) that heal electronic circuits. FIG. 8 shows a normalized vector field of a D flip-flop. In some embodiments, a normalized voltage field of the flip-flop is represented as a subset $[-2, 2]\times[-2, 2]$ of $\mathbb{R}^2$.

In FIG. 8, fixed points $a=(1, -1)$ and $b=(-1, 1)$ represent two stable states: $Q(t)$ and $\overline{Q}(t)$ correspond to the 1st and 2nd coordinates of the fixed point. Bit $0\leftrightarrow-1$ in the vector field and bit $1\leftrightarrow1$. In FIG. 3, $D(t)$ is 0 (low) or 1 (high), which represents two logical states that a D flip-flop can store. In a circuit, shown in FIG. 2 a high logical state, represented as output $Q(t)=1$ can correspond to 3.3 volts. In other embodiments, it could correspond to 5 volts, depending upon the particular flip-flop. The rest of this section defines the differential equations that produce the vector (e.g., normalized voltage values) field in FIG. 8.

Let c, d and $L_0$ be constants that are real numbers. For a fixed point $p=(p_1, p_2)$ in the square $\{(x, y)\in \mathbb{R}^2: -2\leq x, y\leq 2\}$ and any point $u=(u_1, u_2)\in \mathbb{R}^2$, define metric $\|p-u\|^2=(p_1-u_1)^2+(p_2-u_2)^2$. Define a radially symmetric function centered at p as $$L_p(u) = \frac{L_0}{1 + e^{c\|p-u\|^2-d}}.$$

Function $L_p(u)$ helps define a differential equation (0.9) flip-flop model. (In the section titled "Adding Input to the Circuit" signal input is added. In the section titled "Noise Can Disrupt Flip-Flop Toggling in Circuits" noise input is added to our circuit model.)

$$\frac{du}{dt} = \tag{0.4}$$

$$L_a(u)\begin{pmatrix} \cos\alpha(u) & -\sin\alpha(u) \\ \sin\alpha(u) & \cos\alpha(u) \end{pmatrix}(a-u) + L_b(u)\begin{pmatrix} \cos\beta(u) & -\sin\beta(u) \\ \sin\beta(u) & \cos\beta(u) \end{pmatrix}(b-u)$$

$\alpha(u)$ and $\beta(u)$ have two favorable properties:

Angles $\alpha(u)$ and $\beta(u)$ are smooth functions of u near the stable manifold $u_2=u_1$ that separates the basins of attraction of stable fixed points a and b.

Angle functions $\alpha(u)$ and $\beta(u)$ help model flip-flop behavior measured in hardware.

Figure 23:
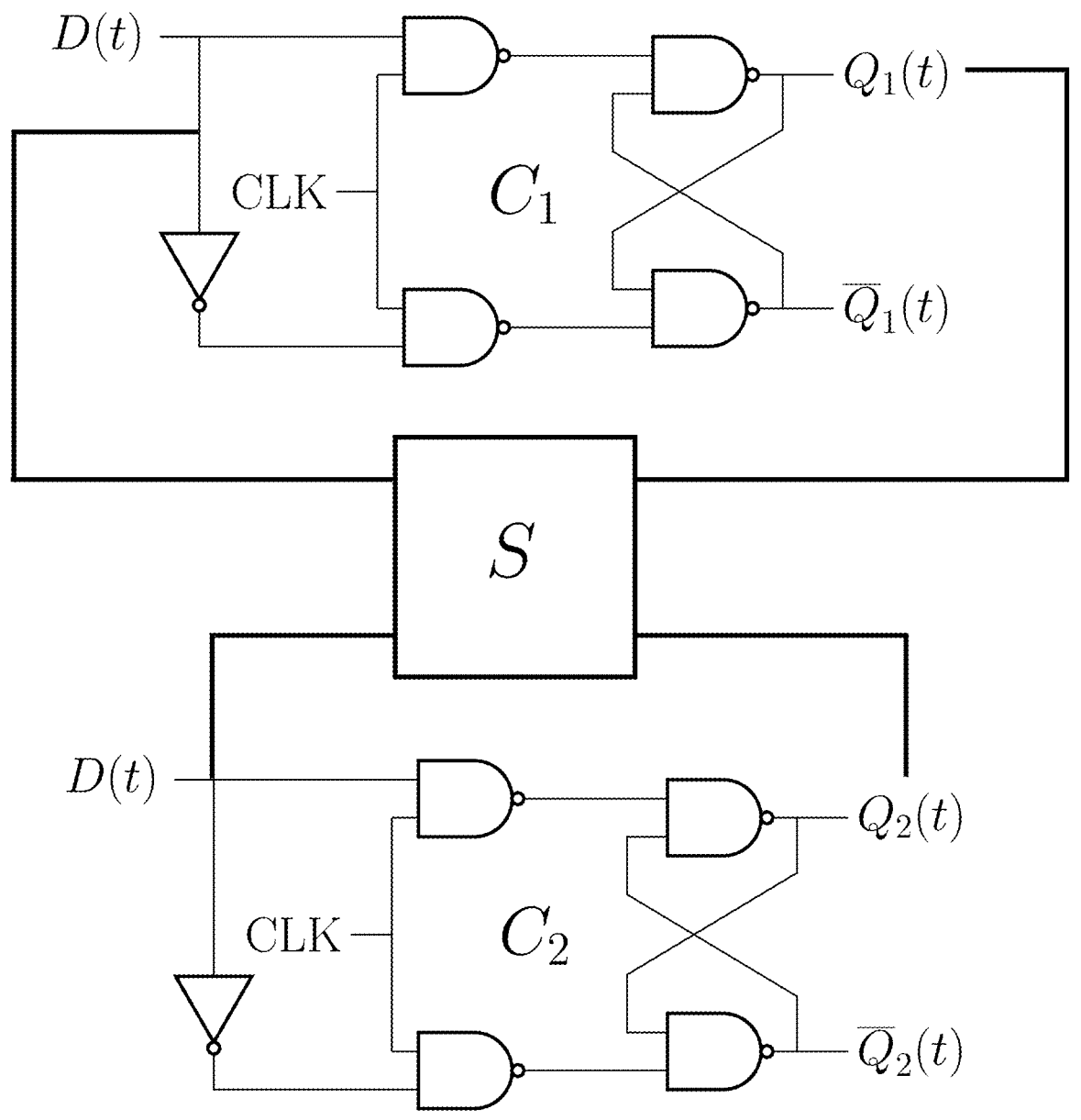
FIG. 23 shows an embodiment of a self-modifiable electronic circuit, labelled by symbol S. In one embodiment, subcircuit S implements machine-implemented method 2 (meta operator 2) in hardware. Similar for FIG. 2, subcircuit $C_1$ is constructed from four NAND gates and one NOT gate. Similar to FIG. 2, subcircuit $C_2$ is constructed from four NAND gates and one NOT gate. Subcircuits $C_1$ and $C_2$ differ from FIG. 2 because they both have input and output lines connected to subcircuit S that can self-modify the dynamical behavior of $C_1$ and $C_2$ when a noise attack occurs.

The rest of this section describes and defines machine-implemented method functions that help build $\alpha(u)$ and $\beta(u)$ in hardware circuits such as the one in FIG. 2 and two subcircuits in FIG. 23. $g_A$ and $g_B$ are constructed from fixed points $A=(a_1, a_2)$, $B=(b_1, b_2)$, and constant $\kappa$. For $u=(u_1, u_2)$, define $$g_A(u) = \frac{1}{2} + \frac{1}{2}\tanh(u_1 - \kappa a_1),$$

and define $$g_B(u) = \frac{1}{2} - \frac{1}{2}\tanh(u_1 - \kappa b_1).$$

For $u=(u_1, u_2)$ and fixed point $p=(p_1, p_2)$, define $\angle(p, u)=\mathrm{atan2}(p_2-u_2, p_1-u_1)$. Circuit-implemented method $\angle(p, u)$ computes the angle between the x-axis and the vector $\vec{p}-\vec{u}$, where $\vec{p}=(p_1, p_2)$ and $\vec{u}=(u_1, u_2)$. Recall that $$\mathrm{atan2}(y, x) = \begin{cases} \arctan(y/x) & \text{if } x > 0 \\ \arctan(y/x) + \pi & \text{if } x > 0 \text{ and } y \geq 0 \\ \arctan(y/x) - \pi & \text{if } x > 0 \text{ and } y < 0 \\ \pi/2 & \text{if } x = 0 \text{ and } y > 0 \\ -\pi/2 & \text{if } x = 0 \text{ and } y < 0 \\ \text{undefined} & \text{if } x = 0 \text{ and } y = 0 \end{cases}$$

Define $$\phi_B(u) = -\frac{\pi}{2}\tanh(u_2).$$

Define $\phi_A(u)$=atan2(sin $\gamma(u)$, cos $\gamma(u)$), where $\gamma(u)$=$\pi$−$\phi_B(u)$. Define $$\alpha(u) = \frac{1}{2}g_A(u)(\phi_A(u) - L(A, u)).$$

$$\beta(u) = \frac{1}{2}g_B(u)(\phi_B(u) - L(B, u)).$$

Define

Constants c=0.8, d=1, $L_0$=2, and $\kappa$=3, and fixed points a=(1, −1) and b=(−1, 1) generated the vector field shown in FIG. 8. These constants were chosen, primarily based on Julia [37] software simulations.

For all values c in interval [0.8, 1.3], d in [0.4, 1.2], $L_0$ in [1, 3], and $\kappa$ in [3, $\infty$), the vector field, in equation (0.9), "stays qualitatively close to the vector field" in FIG. 8: stable fixed points a and b do not move or vanish, and the two basins of attraction are separated by the line $u_2$=$u_1$. At values $$c = \frac{1}{2}, d = \frac{4}{5},$$

$L_0$=2, $\kappa$=3, fixed points a and b, on opposite sides of $u_2$=$u_1$, vanish: a bifurcation occurs near $$c = \frac{1}{2}.$$

These bifurcation values are important for the self-modifiable method that will be described later, as the self-modifiable circuit S, shown in FIG. 23, should assure that the two stable fixed points are preserved in the electronic circuit, shown in FIG. 2.

Adding Input to the Circuit

FIG. 8 shows a vector field of a D flip-flop that has two stable outputs. In one output, the orbit of the flip-flop's circuit reaches the attracting fixed point at b=(−1, 1); in the second output state, the orbit reaches the attracting fixed point a=(1, −1). For example, the first coordinate of b can represent a logical 0 bit; the first coordinate of a can represent a logical 1 bit.

For u=($u_1$, $u_2$), line $u_2$=$u_1$ is a boundary of the system of circuit-implemented equations, defined in equation (0.9), because it separates initial points u(0) that eventually reach fixed point a=(1, −1) and points that eventually reach fixed point b=(−1,1). In electronics, $u_2$=$u_1$ is sometimes called a wall; in dynamical systems, $u_2$=$u_1$ is a stable manifold with saddle fixed point (0, 0). For all initial points u(0)=($x_0$, $y_0$) satisfying $x_0$<$y_0$, the orbit of u(0) converges to b=(−1, 1). For all points u(0)=($x_0$, $y_0$) satisfying $x_0$>$y_0$, the orbit of u(0) converges to a=(1, −1).

We add input signal $\mathcal{I}$ (t) with constants $K_1$, $K_2$:

$$\frac{du}{dt} = L_a(u)\begin{pmatrix} \cos\alpha(u) & \sin\alpha(u) \\ \sin\alpha(u) & \cos\alpha(u) \end{pmatrix}(a - u) + \quad (0.5)$$

-continued
$$L_b(u)\begin{pmatrix} \cos\beta(u) & \sin\beta(u) \\ \sin\beta(u) & \cos\beta(u) \end{pmatrix}(b - u) + \begin{pmatrix} K_1 \\ K_2 \end{pmatrix}\mathcal{I}(t)$$

An embodiment of input signal $\mathcal{I}$ (t) to the flip-flop circuit is defined that illustrates how an input signal can toggle the flip-flop between fixed points a=(1, −1) and b=(−1,1). This corresponds to storing a 0 or 1 with the flip-flop. For parameters $T_0$, period $\rho$ and pulse width $\tau$, define r(t, $T_0$, $\rho$)=(t−$T_0$) mod $\rho$. Define $$\psi(t, T_0, \rho, \tau) = \begin{cases} 1 & \text{if } r(t, T_0, \rho) \leq \tau \text{ and } \lfloor(t - T_0)/\rho\rfloor \text{ is even.} \\ -1 & \text{if } r(t, T_0, \rho) \leq \tau \text{ and } \lfloor(t - T_0)/\rho\rfloor \text{ is odd.} \\ 0 & \text{if } r(t, T_0, \rho) > \tau \end{cases}$$

Figure 9:
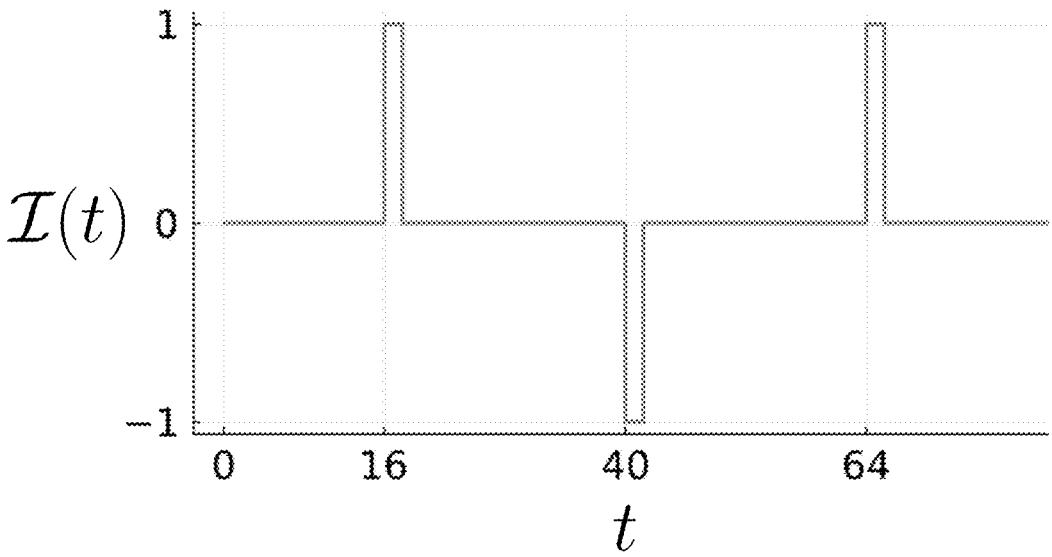
FIG. 9 shows an embodiment of an input signal $\mathcal{I}$ (t) sent to a flip-flop. In some embodiments, the input signal is sent the CLK input, shown in FIG. 2

$\mathcal{I}$ (t)=$\psi$(t, 16, 24, 1.8) is shown in FIG. 9. $\mathcal{I}$ (t) is normalized to 1. If an electronic flip-flop operates at 3 volts, then $\mathcal{I}$ (t)=1 can correspond to ±3 volts in the flip-flop circuit.

A Toggled Flip-Flop Orbit

Figure 10:
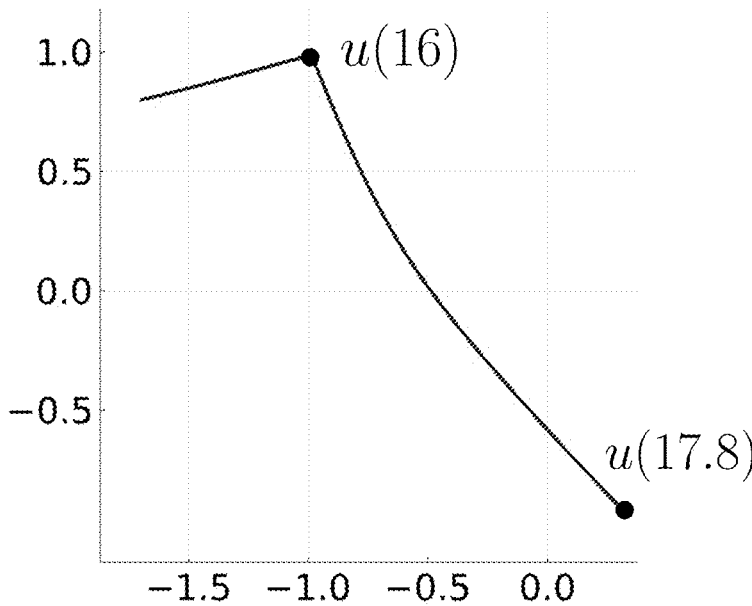
FIG. 10 shows an embodiment of how a positive pulse of the input signal (+1) in FIG. 9 toggles the flip-flop to a different state, beginning at time t=16. The bottom diagram shows the results of the toggle from t=17.8 to t=20 so that the flip-flop is at fixed point a=(1, −1). In some embodiments, this toggle represents Q(t) storing a logical value of 1, corresponding to fixed point a=(1, −1).
Figure 10:
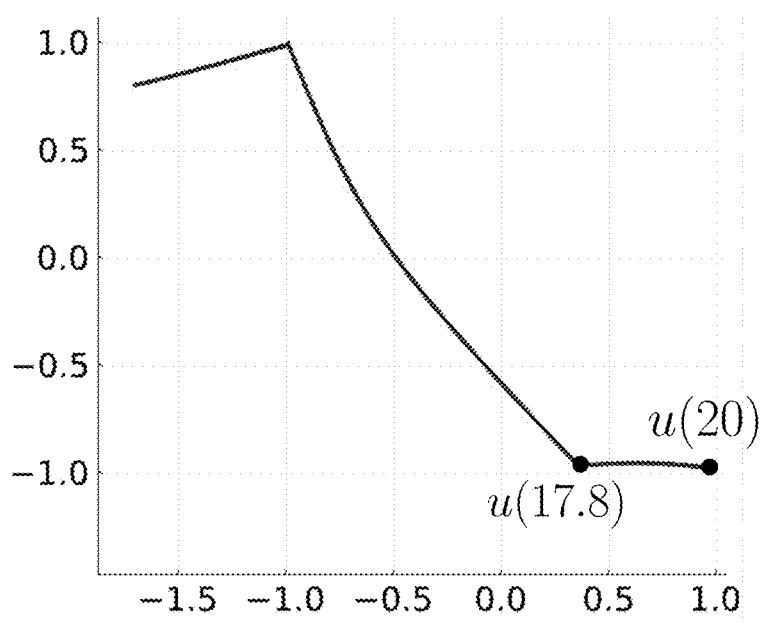

FIG. 10 shows an orbit of the flip-flop circuit with initial point u(0)=(−1.7, 0.8) during the time period $\Gamma$=[0, 17.8]. During u(t)'s entire orbit, the constant values are $K_1$=0.6, $K_2$=−1.5, $T_0$=16, period p=24, and width $\tau$=1.8. Input signal $\mathcal{I}$ (t)=$\psi$t, 16, 24, 1.8), where $\mathcal{I}$ (16)=1, as shown in FIG. 9.

Point u(16) is very close to stable fixed point b=(−1, 1). $\mathcal{I}$ (t)'s effect on u(t)'s orbit is shown in FIG. 10: at time t=16, the orbit abruptly changes. When $\mathcal{I}$ (t)=1, term ($K_1$ $\mathcal{I}$ (t), $K_2\mathcal{I}$ (t)) dominates the other terms in equation (2) that create the vector (voltage) field in FIG. 8. During time period [16, 17.8], the orbit crosses boundary $u_2$=$u_1$, so u(17.8) is in fixed point a's basin of attraction.

Figure 11:
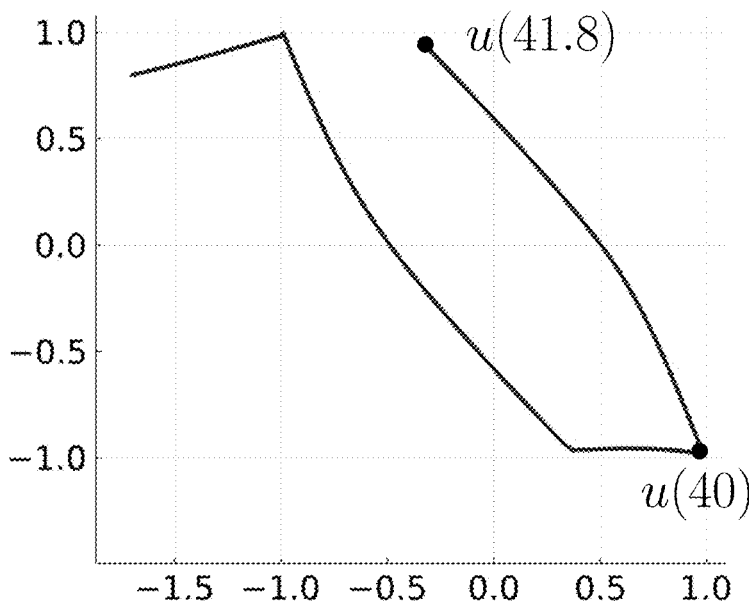
FIG. 11 shows an embodiment of how a negative pulse (−1) of the input signal in FIG. 9, toggles the flip-flop to a different state, beginning at time t=40. By t=41.8, the flip-flop is now in the attractor corresponding to fixed point b=(−1, 1). In the bottom diagram, at t=45, the flip-flop is at fixed point b=(−1, 1). In some embodiments, this toggle represents Q(t) storing a logical value of 0, corresponding to fixed point b=(−1, 1).
Figure 11:
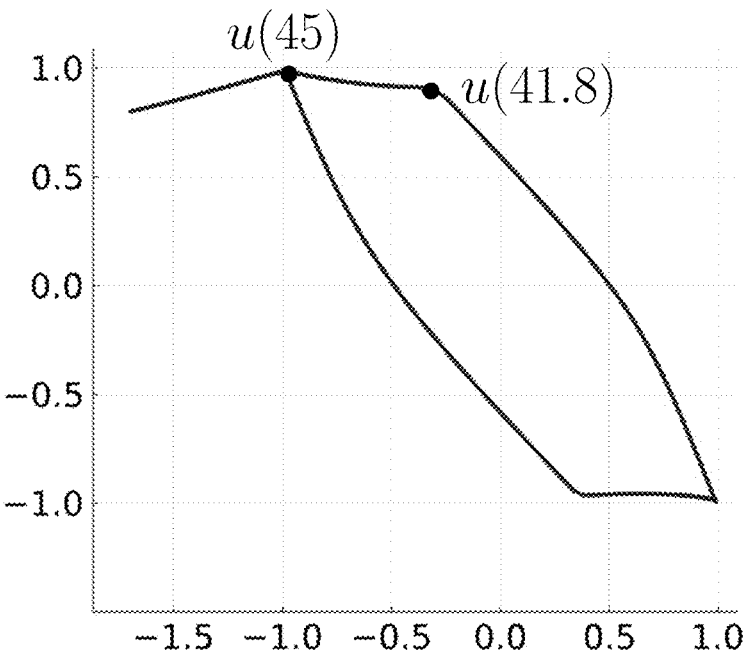

During time period (17.8, 20], $\mathcal{I}$ (t)=0. u(t)'s orbit follows the voltage field in FIG. 8. u(20) is close to fixed point a=(1, −1), as shown in FIG. 11. During period [20, 40), $\mathcal{I}$ (t)=0, so u(t)'s orbit approaches even closer to a.

At time t=40, $\mathcal{I}$ (40)=−1 so there is an abrupt change in the orbit. During time period [40, 41.8], FIG. 11 shows the orbit has crossed the boundary $u_2$=$u_1$. Point u(41.8) is in fixed point b's basin of attraction. During period [41.8, 45], $\mathcal{I}$ (t)=0. u(t) follows the vector field in FIG. 8 and approaches b=(−1, 1), as shown in FIG. 11.

We describe how $\mathcal{I}$ (t)'s toggling relates to a digital logic table in FIG. 3. ($K_1$ $\mathcal{I}$ (t), $K_2\mathcal{I}$ (t)) models data input D(t) combined with clock input CLK. Q(t)=0, $\overline{Q}$(t)=1 corresponds to b=(−1, 1). Q(t)=1, $\overline{Q}$(t)=0 corresponds to a=(1, −1). $\mathcal{I}$ (t)=0 corresponds to row 3 of Table 1. $\mathcal{I}$ (t)=1 at t=16 corresponds to row 2, where Q(t+1) is set to 1, as u(20)≠a. Q(t+1)'s time scale is distinct from u(t)'s time scale. $\mathcal{I}$ (40)=−1 corresponds to row 1, where Q(t+1) is set to 0, as u(t) is toggled to b.

If input constants $K_1$, $K_2$ are too small, then |$K_1$| and |$K_2$| must be substantially different. When |$K_1$| and |$K_2$| are small and |$K_1$|≠|$K_2$|, u(t)'s orbit cannot be successfully toggled from one fixed point to the other fixed point because the vector field is close to zero near the saddle point (0, 0). When $K_1$=0.6, $K_2$=−0.6, c=0.8, d=1, $L_0$=2, $\kappa$=3 with u(0)=(−1.7, 0.8) as in FIGS. 4-7, and $\tau$=1.8 then u(17.8)≈(−0.484, 0.492). The flip-flop's orbit does not cross the boundary $u_2$=$u_1$ and returns to fixed point b by time t=24. Keeping the other constants the same, when $K_1$=1.5 and $K_2$=−1.5 with u(0)=(−1.7, 0.8), then u(17.8)≈(1.47, −1.47), so the orbit successfully crosses boundary $u_2$=$u_1$.

Successful toggling depends upon the time width $\tau$ of input signal $\mathcal{I}$ (t). For example, when $K_1$=1.5 and $K_2$=−1.5 with u(0)=(−1.7, 0.8) and $\tau$=1, the orbit successfully crosses the boundary $u_2=u_1$. When $\tau=0.8$, the orbit does not cross $u_2=u_1$ and by time $t=24$, $u(24)\approx(-0.986, 0.987)\approx b$.

Parameter constants such as $K_1$, $K_2$, c, d, $L_0$, $\kappa$ and the boundary $u_2=u_1$ are critical to properly tuning the self-modifiable circuit, so it can heal a flip-flop circuit from a noise attack.

Noise Can Disrupt Flip-Flop Toggling in Circuits

A noise pulse can disrupt flip-flop toggling. Noise term $\eta(t)$ is added to equation (0.5). $K_3$, $K_4$ are constants.

$$\frac{du}{dt} = L_a(u) \begin{pmatrix} \cos\alpha(u) & -\sin\alpha(u) \\ \sin\alpha(u) & \cos\alpha(u) \end{pmatrix} (a-u) + \qquad (0.6)$$

$$L_b(u) \begin{pmatrix} \cos\beta(u) & \sin\beta(u) \\ \sin\beta(u) & \cos\beta(u) \end{pmatrix} (b-u) + \begin{pmatrix} K_1 \\ K_2 \end{pmatrix} \mathcal{I}(t) + \begin{pmatrix} K_3 \\ K_4 \end{pmatrix} \eta(t)$$

Figure 12:
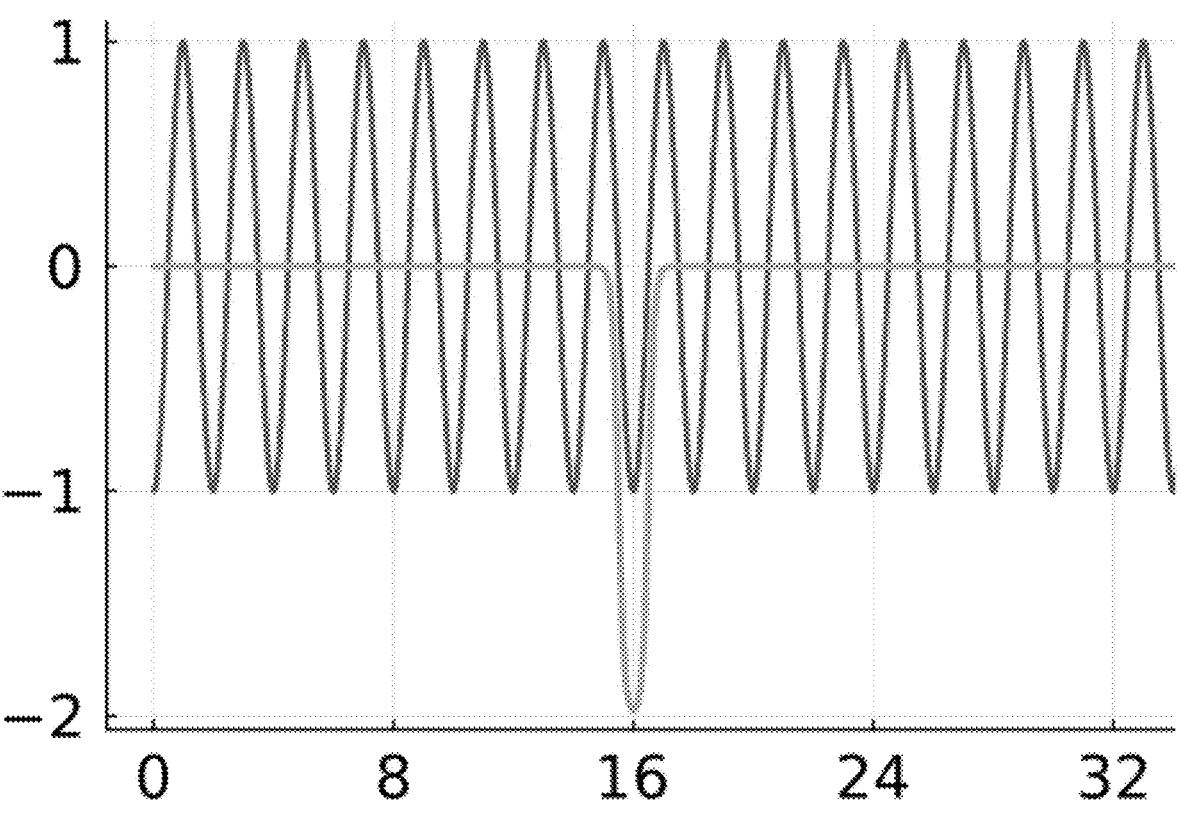
FIG. 12 show an embodiment of noise components that are used to build noise injections on a D flip-flop. The noise helps test when a self-modifiable circuit can heal the noise and assure the flip-flop can compute the correct value.
Figure 13:
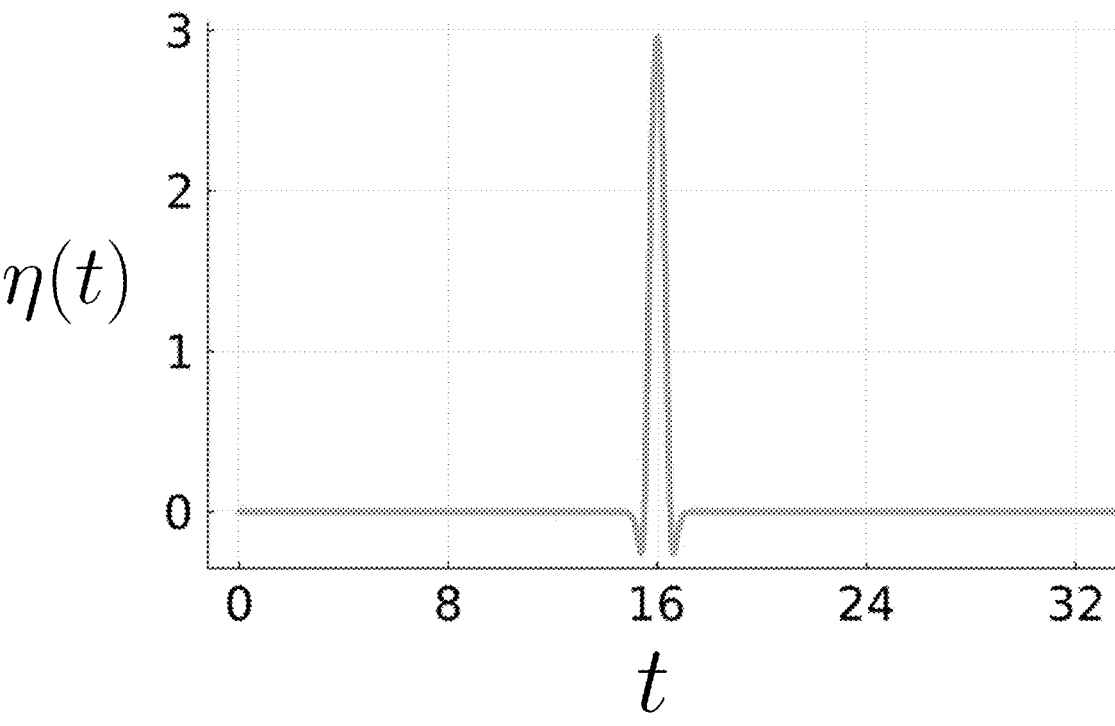
FIG. 13 shows an embodiment of a noise pulse η(t) built from noise components in FIG. 12. The peak of the noise pulse is at time t=16.

Set $h(t, l, f)=\sin(2\pi f(t-l))$. Set $g(t, l, \delta, k)=\tan h(k(t-l))+\tan h(-k(t-l+\delta))$. In FIG. 12, h is a sine wave, and g is a downward pulse, centered near $t=16$. Define $\chi(t, l, f, \delta, k, \mathcal{A})=\mathcal{A} *g(t, l, \delta, k)*h(t, l, f)$. $\chi$ is a family of machine-implemented noise functions, parameterized by l, f, $\delta$, k and $\mathcal{A}$. FIG. 13 shows an instance of $$\eta(t) = \chi\left(t, \frac{33}{2}, \frac{1}{2}, 1, 5, \frac{3}{2}\right).$$

In FIG. 13, $$l = \frac{33}{2}$$

is the time location of the noise.

$$f = \frac{1}{2}$$

is the frequency of function h. $\delta=1$ is the time width of function g. Constant $k=5$ sets the steepness of g on each side of time l.

$$\mathcal{A} = \frac{3}{2}$$

is the amplitude.

Figure 14:
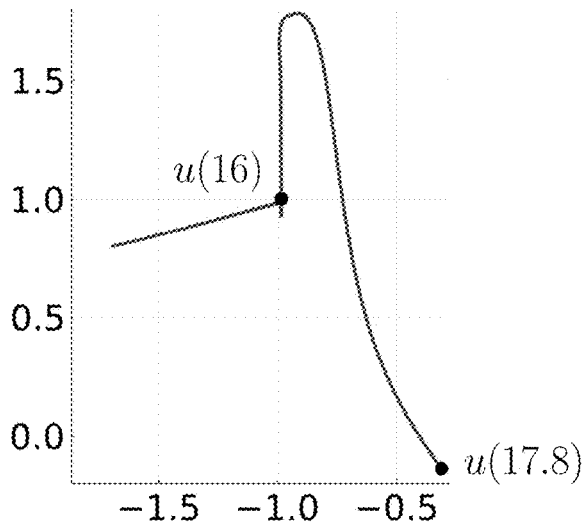
FIG. 14 shows an embodiment of the noise pulse in FIG. 13, disrupting the toggling of the flip-flop, shown in FIG. 2.
Figure 14:
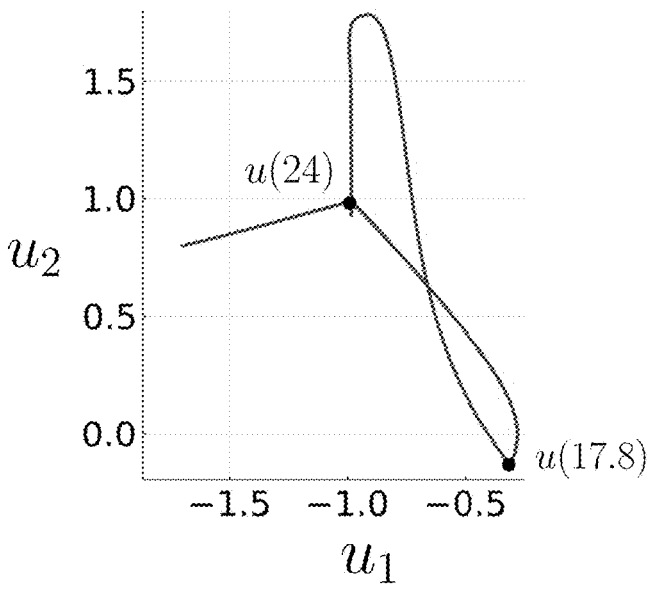

FIG. 14 shows a noise injection on $u(t)=(u_1(t), u_2(t))$ where $K_3=0$ and $K_4=1.0$. Input $\mathcal{I}(t)=\psi(t, 16, 24, 1.8)$. Noise $$\eta(t) = \chi\left(t, \frac{33}{2}, \frac{1}{2}, 1, 5, \frac{3}{2}\right)$$

disrupts $u_2(t)$'s orbit during time period [14.5, 17.5] because $|\eta(t)|<10^{-19}$ whenever t lies in $[0, 14.5)\cup(17.5, +\infty)$.

FIG. 14 shows the effect on $u(0)=(-1.7, 0.8)$'s orbit. $u(17.8)$ still lies in fixed point b's basin of attraction. Compare FIG. 14 and FIG. 10. During period [17.8, 24], FIG. 14 shows that $u(0)$'s orbit converges to fixed point $b=(-1, 1)$. Noise $\eta(t)$, shown in FIG. 13, has disrupted input signal $\mathcal{I}(t)$'s flip-flop toggling.

Adding Healing Variables

When a simulated EEMI attacks a D flip-flop, an effective attack creates enough noise for a long enough period of time so that the orbit of the flip-flop circuit is corrupted with respect to the boundary $u_2=u_1$. The noise causes the output Q(t) (FIG. 2) of the flip-flop to compute or store the incorrect value (for example, voltage). Our invention(s) describe machine-implemented and circuit-implemented methods of healing a disrupted flip-flop orbit.

An information theory [41, 42] analogy is helpful in explaining our invention(s) and distinguishing our inventions from information theory. Suppose Alice transmits 16 bits of signal to Bob. If any of the 16 bits are flipped due to noise in the transmission medium, Bob has no way of knowing if any of the bits have been flipped. To repair errors that occur during the transmission of the signal, Alice must transmit additional bits that help Bob with error code correction [43]. It is important to clarify a fundamental difference between information theory and error code correction and the invention(s) described herein. Information theory and error code correction do not address when the computation performed by Alice and Bob makes a mistake (due to flaws in the hardware, software, or external physical effects such as electromagnetic radiation) or is sabotaged from noise delivered by a sentient being with the purpose of subverting the purpose of the computation. In this sense, the invention(s) described herein are more fundamental than information theory, and error correction based on information theory. To make an analogy, it is similar to asking whether the brain is more fundamental than the muscles in the body that the brain actuates.

An extension of machine-implemented equation (0.6) adds new circuit variables (e.g., new subcircuits) that heal the flip-flop orbit when it is disrupted by noise. Set $v_1(t)=(u_1(t), u_2(t))$. For $i\geq2$, set $v_i(t)=(u_{2i-1}(t), u_{2i}(t))$. Define n machine-implemented (or circuit-implemented) differential equations, where each i is in 1, . . . , n:

$$\frac{dv_i}{dt} = L_a(v_i) \begin{pmatrix} \cos\alpha_i(v_i) & -\sin\alpha_i(v_i) \\ \sin\alpha_i(v_i) & \cos\alpha_i(v_i) \end{pmatrix} (a-v_i) + \qquad (0.7)$$

$$L_b(v_i) \begin{pmatrix} \cos\beta_i(v_i) & \sin\beta_i(v_i) \\ \sin\beta_i(v_i) & \cos\beta_i(v_i) \end{pmatrix} (b-v_i) + \begin{pmatrix} K_{i,1} \\ K_{i,2} \end{pmatrix} \mathcal{I}(t) + \begin{pmatrix} K_{i,3} \\ K_{i,4} \end{pmatrix} \eta_i(t)$$

Analogous to $\alpha(u)$ and $\beta(u)$ in the section titled "A D Flip Flop Gate Model", circuit-implemented angles $\alpha_1$ and $\beta_1$ are computed between the two vectors derived from $u_1$ and $u_2$. If $i\geq2$, angles $\alpha_i$ and $\beta_i$ are computed between the two vectors derived from $u_{2_{i-1}}$ and $u_{2i}$.

When $n=2$, two new variables $u_3$, $u_4$ and two or more standard differential equations are added to the system. System (machine-implemented equations) $u(t)=(u_1(t), u_2(t), u_3(t), u_4(t))$ is subject to equation (0.7). Configure boundary conditions $u_1(0)=u_3(0)$ and $u_2(0)=u_4(0)$. (In some embodiments, the boundary conditions correspond to voltages: that is, the voltages of $u_1$ and $u_3$ at time 0 are equal, and the voltages of $u_2$ and $u_4$ at time 0 are equal.) Configure input constants $K_{1,1}=K_{2,1}=0.6$, and $K_{1,2}=K_{2,2}=-1.5$. Set noise constants $K_{1,3}=K_{2,3}=K_{2,4}=0$, and $K_{1,4}=1$.

Both $v_1(t)$ and $v_2(t)$ have the same stable fixed points $a=(a_1, a_2)$ and $b=(b_1, b_2)$. Hence, if noise injection does not occur, then the orbits of circuit-implemented $v_1(t)$ is identical to circuit-implemented $v_2(t)$: $v_1(t)=v_2(t)$ for all t.

When $u_1$ and $u_2$ in a circuit perform the computation, then $u_1$ and $u_2$ are called signal variables. Moreover, $u_3$ and $u_4$ are called repair or healing variables. (Variables $u_3$ and $u_4$ are analogous to error correction bits.) For each i in {1, 2}, define machine-implemented or circuit-implemented meta differential equations:

$$\frac{d\omega_i}{dt} = \frac{du_{i+2}}{dt} - \frac{du_i}{dt}$$

with initial conditions $\omega_1(0)=\omega_2(0)=0$. $\omega_1$ and $\omega_2$ are meta variables. Define two thresholds $\theta_1$, $\theta_2>0$ and two meta operator execution times $s_1$, $s_2$. (Meta variables and meta operator machines are comprehensively described in sections titled "Meta Variable Machines" and "Meta Operator Machines and Circuits". For example, the section titled "Meta Variable Machines" defines machine detectable events.

$$\text{Set } C_i = (-\infty, -\theta_i] \cup [\theta_i, \infty) \text{ for } i \text{ in } \{1, 2\}.$$

$$\text{Set } f\left(\omega, \frac{d\omega}{dt}, t\right) = \frac{d\omega}{dt}.$$

$$\text{Set } X = \mathbb{R}.$$

Machine Execution Time A

Let $s_1$ be the first time, where $|\omega_1(s)|{\geq}\theta_1$. Then $$s_1 = \inf\left\{\tau \geq 0: \left|\int_0^\tau \left(\frac{du_3}{dt} - \frac{du_1}{dt}\right)dt\right| \geq \theta_1\right\}. \tag{*}$$

If $s_1$ exists, at time $s_1$ a machine-implemented method (meta operator) $\mathcal{M}_1$ bound to $\omega_1$ executes: $\mathcal{M}_1$ modifies $$\frac{du_1}{dt} = \dots$$

in $$\frac{du}{dt} = L_a(u)\begin{pmatrix}\cos\alpha(u) & -\sin\alpha(u) \\ \sin\alpha(u) & \cos\alpha(u)\end{pmatrix}(a-u) + \tag{0.8}$$

$$L_b(u)\begin{pmatrix}\cos\beta(u) & -\sin\beta(u) \\ \sin\beta(u) & \cos\beta(u)\end{pmatrix}(b-u)$$

$$\text{where}$$

$$u(t) = (u_1(t), u_2(t)).$$

Machine Execution Time B

Let $s_2$ be the soonest time such that $|\omega_2(s_2)|{\geq}\theta_2$. Then $$s_2 = \inf\left\{\tau \geq 0: \left|\int_0^\tau \left(\frac{du_4}{dt} - \frac{du_2}{dt}\right)dt\right| \geq \theta_2\right\}. \tag{**}$$

If $s_2$ exists, then at time $s_2$ machine-implemented method (meta operator) $\mathcal{M}_2$ bound to $\omega_2$ executes: $\mathcal{M}_2$ modifies $$\frac{du_2}{dt} = \dots$$

in $$\frac{du}{dt} = L_a(u)\begin{pmatrix}\cos\alpha(u) & -\sin\alpha(u) \\ \sin\alpha(u) & \cos\alpha(u)\end{pmatrix}(a-u) + \tag{0.9}$$

$$L_b(u)\begin{pmatrix}\cos\beta(u) & -\sin\beta(u) \\ \sin\beta(u) & \cos\beta(u)\end{pmatrix}(b-u)$$

$$\text{where}$$

$$u(t) = (u_1(t), u_2(t)).$$

Both Machine Execution Time A and B satisfy a machine-implemented or circuit-implemented physically detectable event condition (0.3), defined in section titled "Meta Variable Machines". A machine-implemented or circuit-implemented meta operator 1 is defined in machine-implemented method 1.

Machine-Implemented Method 1. Meta Operator 1 if $|\omega_1(s_1)| \geq \theta_1$ or $|\omega_2(s_2)| \geq \theta_2$
for i in $\{1, 2\}$
{
   $(u_1(s_i), (u_2(s_i))$ is the current point.

set $\frac{du_i}{dt}(u_1, u_2, s) = 0$ for $s \in [s_1, s_i + \theta_i]$.

}

Figure 15:
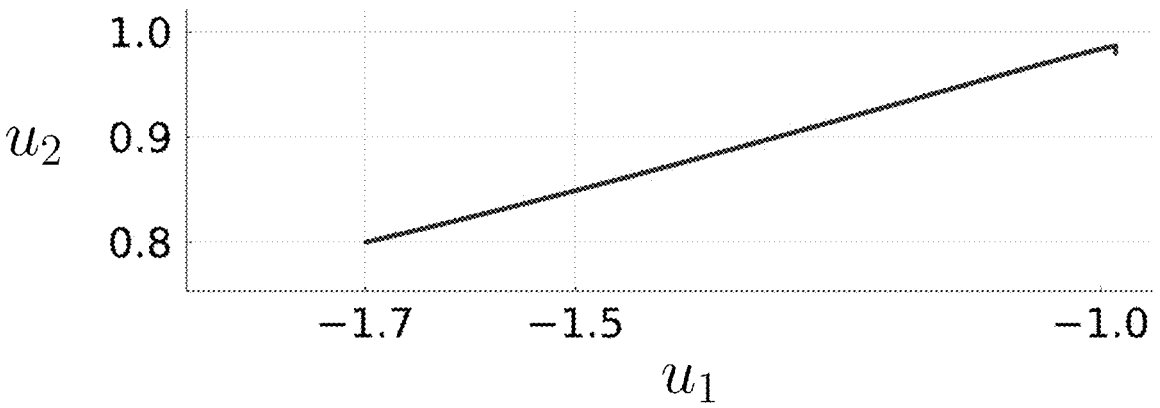
FIG. 15 shows an embodiment of machine-implemented method 1 (meta operator 1) detecting and disabling a noise injection on a D flip-flop.

Set $\theta_1=\theta_2=0.01$. FIG. 15 shows $(u_1, u_2)$'s orbit when machine-implemented method 1 (meta operator 1) is bound to $\omega_2$ and $\omega_2$. FIG. 10 shows $(u_3(t), u_4(t))$'s orbit. $((u_1(t), u_2(t))$'s orbit is the same as FIG. 10 when there is no noise.) In machine-implemented method 1 (meta operator 1), circuit variables $u_3$ and $u_4$ lock $(u_1, u_2)$'s orbit near fixed point b. In an embodiment with an AND gate to compare to $(u_3, u_4)$, the result of the AND gate can detect a noise injection on $(u_1, u_2)$.

Circuit variables $(u_3, u_4)$ help heal an attack on $(u_1, u_2)$ in machine-implemented method 2.

Machine-Implemented Method 2. Meta Operator 2 if $|\omega_1(s_1)| \geq \theta_1$
{
   $(u_1(s_i), (u_2(s_i))$ is the current point.
   for all $s > s_1$ such that $|\omega_1(s)| \geq \theta_1$:

set $\frac{du_1}{dt}(u_1, u_2, s) = \frac{du_3}{dt}(u_1, u_2, s)$.

}
if $|\omega_2(s_2)| \geq \theta_2$
{
   $(u_1(s_2), (u_2(s_2))$ is the current point.
   for all $s > s_2$ such that $|\omega_2(s)| \geq \theta_2$:

set $\frac{du_2}{dt}(u_1, u_2, s) = \frac{du_4}{dt}(u_1, u_2, s)$.

}

In meta operator 2, the same noise injection is used as in the section titled "Noise Can Disrupt Flip-Flop Toggling in Circuits" that caused the flip-flop toggling to fail, as shown in FIG. 14. The noise constants are $K_{1,3}=0$; $K_{1,4}=1$, and $K_{2,3}=K_{2,4}=0$. During time period [16, 17.8], noise pulse $\eta(t)=\chi(t, \frac{33}{2}, \frac{1}{2}, 1, 5, \frac{3}{2})$, shown in FIG. 13, attempts to disrupt $u_2$'s orbit when input signal $\mathcal{I}(t)=\psi(t, 16, 24, 1.8)$.

Figure 16:
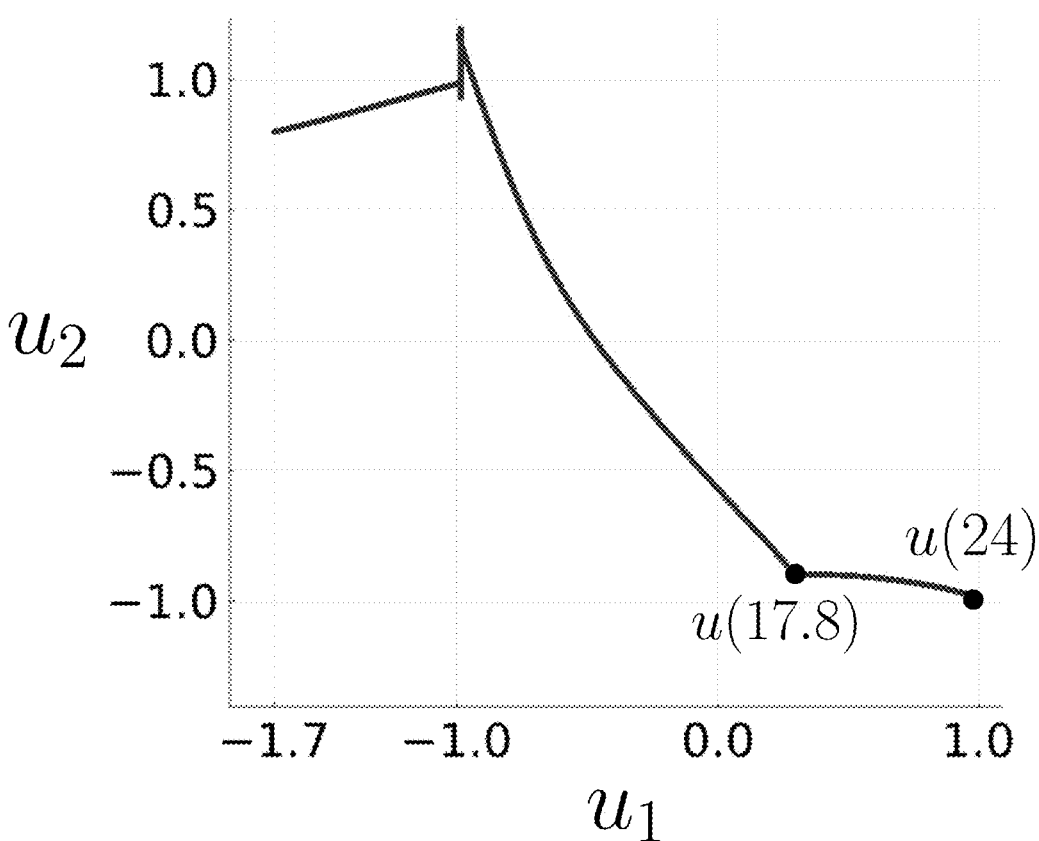
FIG. 16 shows an embodiment of machine-implemented method 2 (meta operator 2) healing the toggle of a flip-flop orbit disrupted by the noise pulse shown in FIG. 13.

FIG. 16 shows that meta operator 2 with $\theta_1=\theta_2=0.2$ successfully heals this noise injection in variable $u_2$. By $t=24$, the orbit $(u_1(t), u_2(t))$ successfully toggles and reaches $a=(1, -1)$. Compare FIG. 16 and FIG. 14.

Observe that $K_{2,3}=K_{2,4}=0$, so healing variables $u_3$, $u_4$ are not attacked with noise. Also, $K_{1,4}=1$, so variable $u_2$ is disrupted by noise near $t=16$. (In FIG. 13, the peak of pulse $\eta(t)$ is near $t=16$.)

Figure 17:
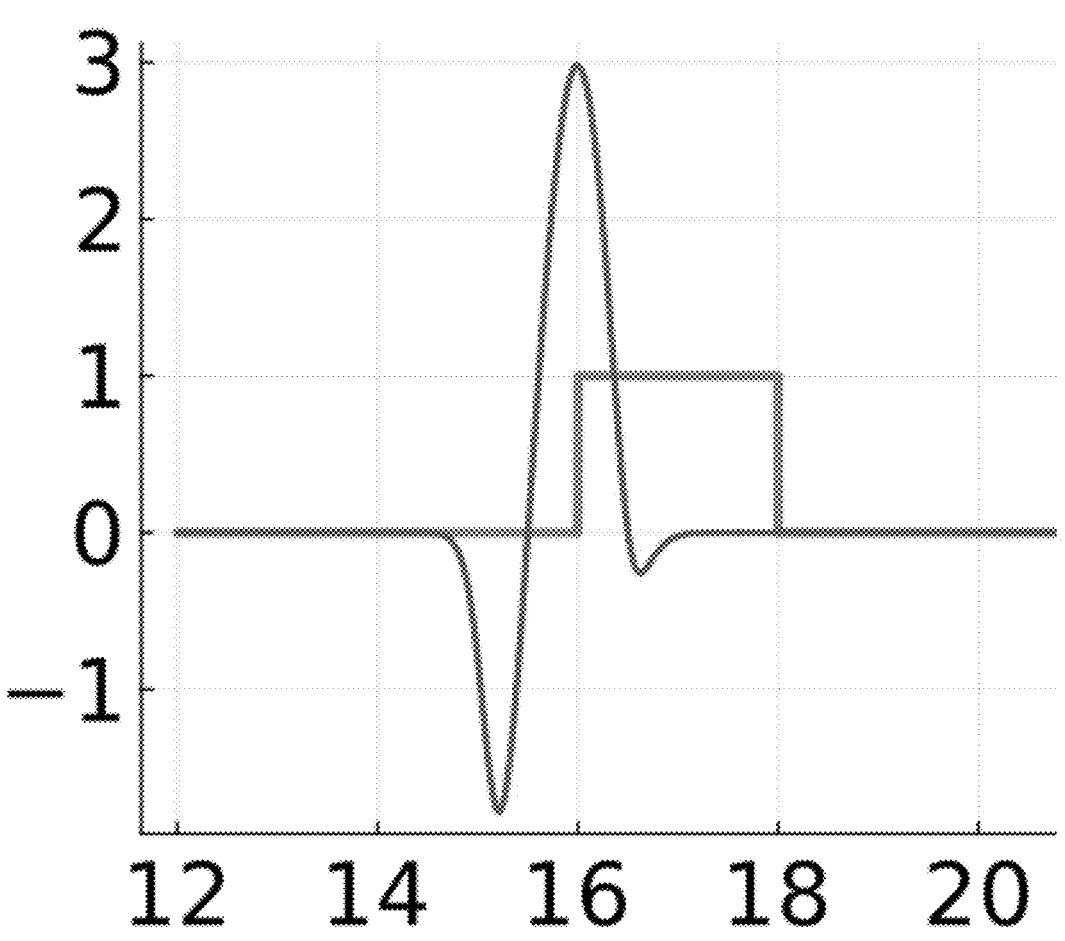
FIG. 17 shows a noise input η(t) (magenta) that looks like a wavelet and a rectangular pulse that is input $\mathcal{I}$ (t).

If the thresholds are set to $\theta_1=\theta_2=1$ and the time width $\delta$ of $\eta(t)$ is set to 1.4, then meta operator 2 no longer can heal the noise disruption. For these same values, $\theta_1=\theta_2=1$ and $\delta=1.4$, if width $\tau$ of $\mathcal{I}$ (t) increases from 1.8 to 2.0, then meta operator 2 successfully heals the stronger noise injection, even with very weak thresholds $\theta_1=\theta_2=1$. There are two effects. Meta operator 2 heals $u_2$'s orbit at $t\approx15.63$. The second effect is that $\eta(t)$ is effectively 0 after $t=17$, and $\mathcal{I}$ (t)=1 until $t=18$, as shown in FIG. 17.

Consider that meta variables $\omega_1$, $\omega_2$ integrate the difference between variables $u_1$, $u_3$ and $u_2$, $u_4$, respectively:

$$\frac{d\omega_i}{dt} = \frac{du_{i+2}}{dt} - \frac{du_i}{dt},$$

where i is 1 or 2. If $|\omega_2|\geq\theta_2=1$, then $|u_2-u_4|\geq1$. This means it is likely that the $(u_1, u_2)$ and $(u_3, u_4)$ orbits are on opposite sides of the line $u_2=u_1$, implying that $u_2$'s orbit was disrupted from its correct orbit.

Meta operator 3 increases the pulse width of $\mathcal{I}$ (t).

Machine-Implemented Method 3. Meta Operator 3

--- if $|\omega_1(s_1)| \geq \theta_1$ OR $|\omega_2(s_2)| \geq \theta_2$
  increase pulse width $\tau$ of input I(t)

---

Meta machine operator 4 combines meta operators 2 and 3.

Machine-Implemented Method 4. Meta Operator 4
  Operator 2 changes the vector field.
  Operator 3 changes the input signal.

--- if $|\omega_1(s_1)| \geq \theta_1$
  execute $s_1$ parts of Meta Operators 2 and 3
if $|\omega_2(s_2)| \geq \theta_2$
  execute $s_2$ parts of Meta Operators 2 and 3

---

Decentralizing Healing Variables in Circuits

In some embodiments, the role of each variable is decentralized over time. Usually, a noise injection only lasts for a short period of time. Decentralization of a task between variables addresses the weakness that a sophisticated Mallory will attempt to attack the weakest part of the system. Hence, in meta operators 1, 2, 3 and 4, if Mallory knows or guesses which variables perform the healing, Mallory will likely attack the healing variables.

To address this single point (variable) of failure, in enhanced embodiments, the circuit variables should heal each other in one or more variable cycles. Decentralization enables each variable to have a dual purpose: signal and healing. After showing how machine-implemented method 2 (meta operator 2) fails on a noise attack on its healing variable, machine-implemented method 5 or circuit-implemented method 5 (meta operator 5) is defined that is more robust to noise. Lastly, we explain variable cyclicity and how changes in the noise parameters and number of variables affects the efficacy of machine-implemented method 5 (meta operator 5).

Figure 18:
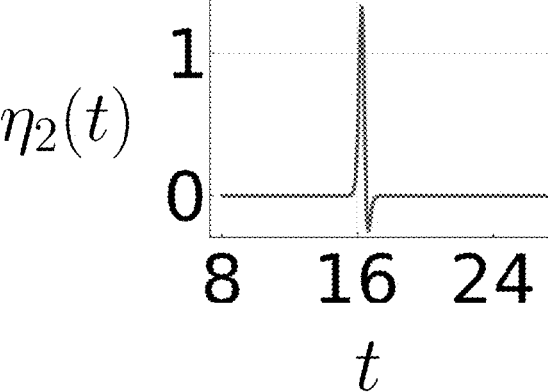
FIG. 18 shows an embodiment of two noise pulses that occur at about time t=16.
Figure 18:
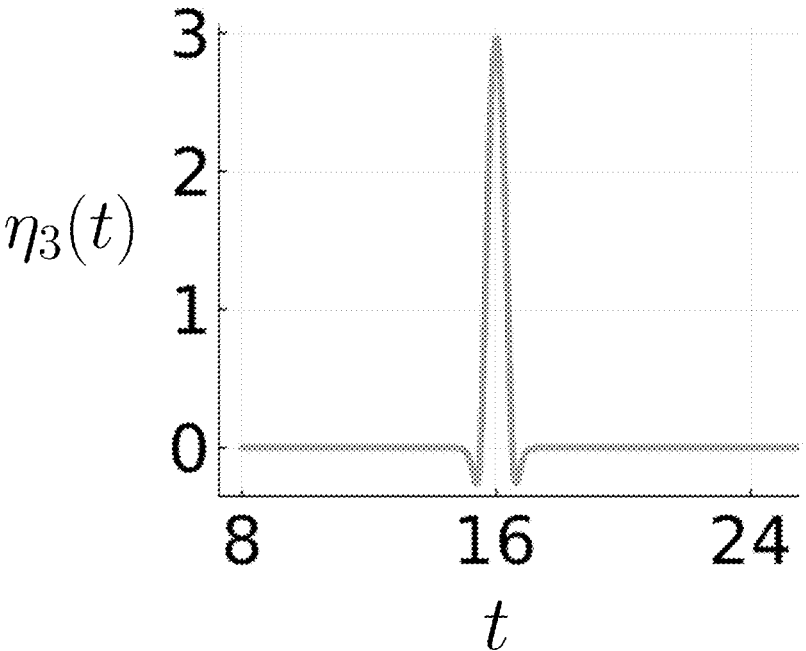

A noise attack on machine-implemented method 2 (meta operator 2) is examined. A successful attack provides an example that demonstrates the intuition of Mallory attacking the healing variable. FIG. 18 shows two noise pulses $\eta_2(t)=\chi(t, 1, f, \delta_2, k, \mathcal{A})$. and $\eta_3(t)=\chi(t, 1, f, \delta_3, k, \mathcal{A})$ with parameters $$l = \frac{33}{2}, f = \frac{1}{2},$$

$$\delta_2 = \frac{1}{3}, \delta_3 = 1, k = 5, \text{ and } \mathcal{A} = \frac{3}{2}.$$

In FIG. 18, $\eta_2$ is the smaller pulse that peaks at a height of slightly more than 1. $\eta_3$ is the larger pulse that at about a height of 3.

Figure 19:
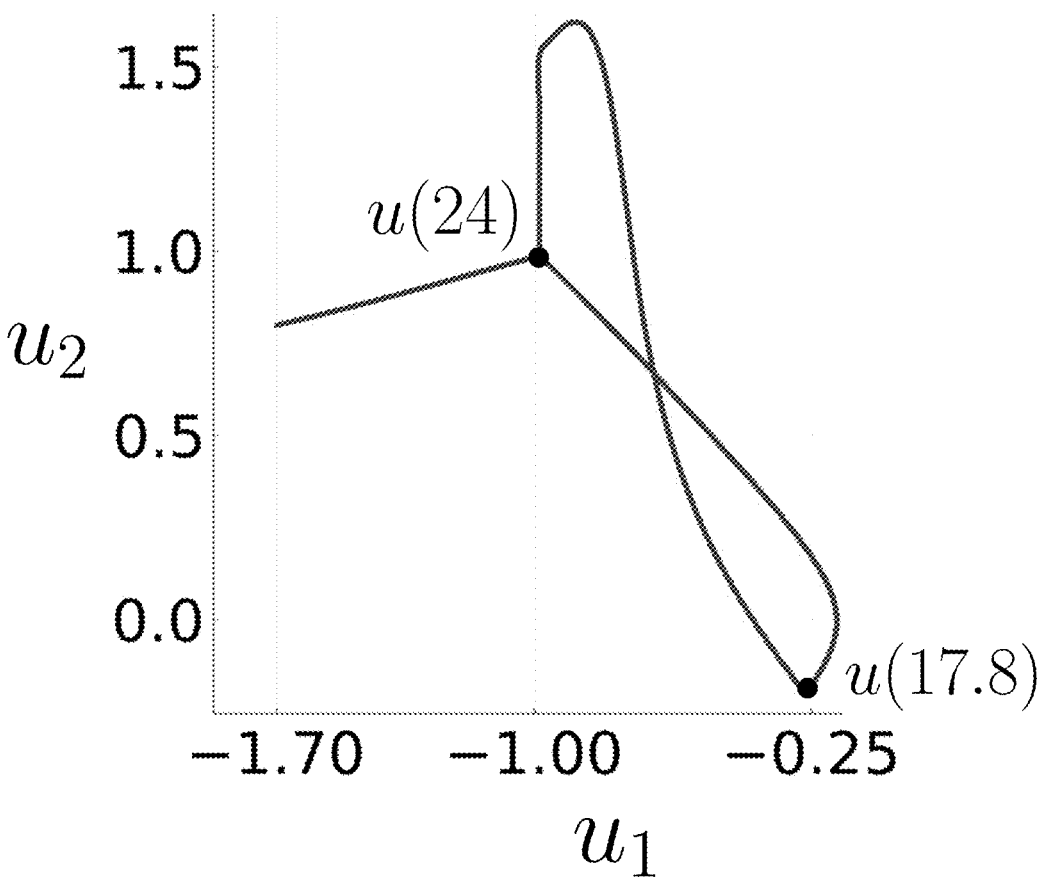
FIG. 19 shows an embodiment of flip-flop toggling, where circuit variable $u_2$ is attacked by the smaller (magenta) noise pulse, shown on the left side of FIG. 18; and circuit variable $u_4$ is attacked by the larger noise (gold) noise pulse, shown on the right side of FIG. 18.

FIG. 19 shows $\eta_2$, $\eta_3$ attacking variables $u_2$, $u_4$, respectively. Machine-implemented method 2 (meta operator 2) fails to heal the noise attack with circuit values $\theta_1=\theta_2=0.2$.

To address the failure of meta operator 2 when both circuit variables $u_2$ and $u_4$ are attacked, a self-modifiable circuit embodiment is extended to six variables ($u_1$, $u_2$, $u_3$, $u_4$, $u_5$, $u_6$). In circuit-implemented method (0.7), i=1,2, or 3. Similar to the section titled "Adding Healing Variables", set circuit values to $K_{1,1}=K_{2,1}=K_{3,1}=0.6$ and $K_{1,2}=K_{2,2}=K_{3,2}=-1.5$, so the same constants are used with input $\mathcal{I}$ (t).

Define meta circuit variables so that the signal and healing functionality in the circuit is decentralized over the variables (i.e., decentralized over the circuit). Let $\omega_1$, $\omega_2$, and $\omega_3$ be the meta variables with initial boundary conditions $\omega_1(0)=\omega_2(0)=\omega_3(0)=0$. Use circuit value $\theta$ to represent all three thresholds. Circuit-implemented method 5 (meta operator) depends upon three meta variable circuit equations:

$$\frac{d\omega_1}{dt} = \frac{du_4}{dt} - \frac{du_2}{dt}.$$

$$\frac{d\omega_2}{dt} = \frac{du_6}{dt} - \frac{du_4}{dt}.$$

$$\frac{d\omega_3}{dt} = \frac{du_2}{dt} - \frac{du_6}{dt}.$$

In an embodiment, $$\frac{du_4}{dt}$$

represents the change in voltage with respect to time of circuit variable $u_4$ that represents the voltage of line $u_4$. In an embodiment, $$\frac{du_2}{dt}$$

represents the change in voltage with respect to time of circuit variable $u_2$ that represents the voltage of line $u_2$. In an embodiment, $$\frac{du_6}{dt}$$

represents the change in voltage with respect to time of circuit variable $u_6$ that represents the voltage of line $u_6$.

In an another embodiment, $$\frac{du_4}{dt}$$

represents the change in current with respect to time of circuit variable $u_4$ that represents the current of line $u_4$. In an embodiment, $$\frac{du_2}{dt}$$

represents the change in current with respect to time of circuit variable $u_2$ that represents the current of line $u_2$. In an embodiment, $$\frac{du_6}{dt}$$

represents the change in current with respect to time of circuit variable $u_6$ that represents the current of line $u_6$.

Machine-Implemented Method 5. Decentralized Circuit-Implemented Variables if $|\omega_1(s_1)| \geq \theta$ AND $|\omega_3(s_3)| \geq \theta$ $$\frac{du_2}{dt} = \frac{1}{2}\left(\frac{du_4}{dt} + \frac{du_6}{dt}\right).$$

if $|\omega_1(s_1)| \geq \theta$ AND $|\omega_2(s_2)| \geq \theta$ $$\frac{du_4}{dt} = \frac{1}{2}\left(\frac{du_2}{dt} + \frac{du_6}{dt}\right).$$

if $|\omega_2(s_2)| \geq \theta$ AND $|\omega_3(s_3)| \geq \theta$ $$\frac{du_6}{dt} = \frac{1}{2}\left(\frac{du_2}{dt} + \frac{du_4}{dt}\right).$$

Figure 20:
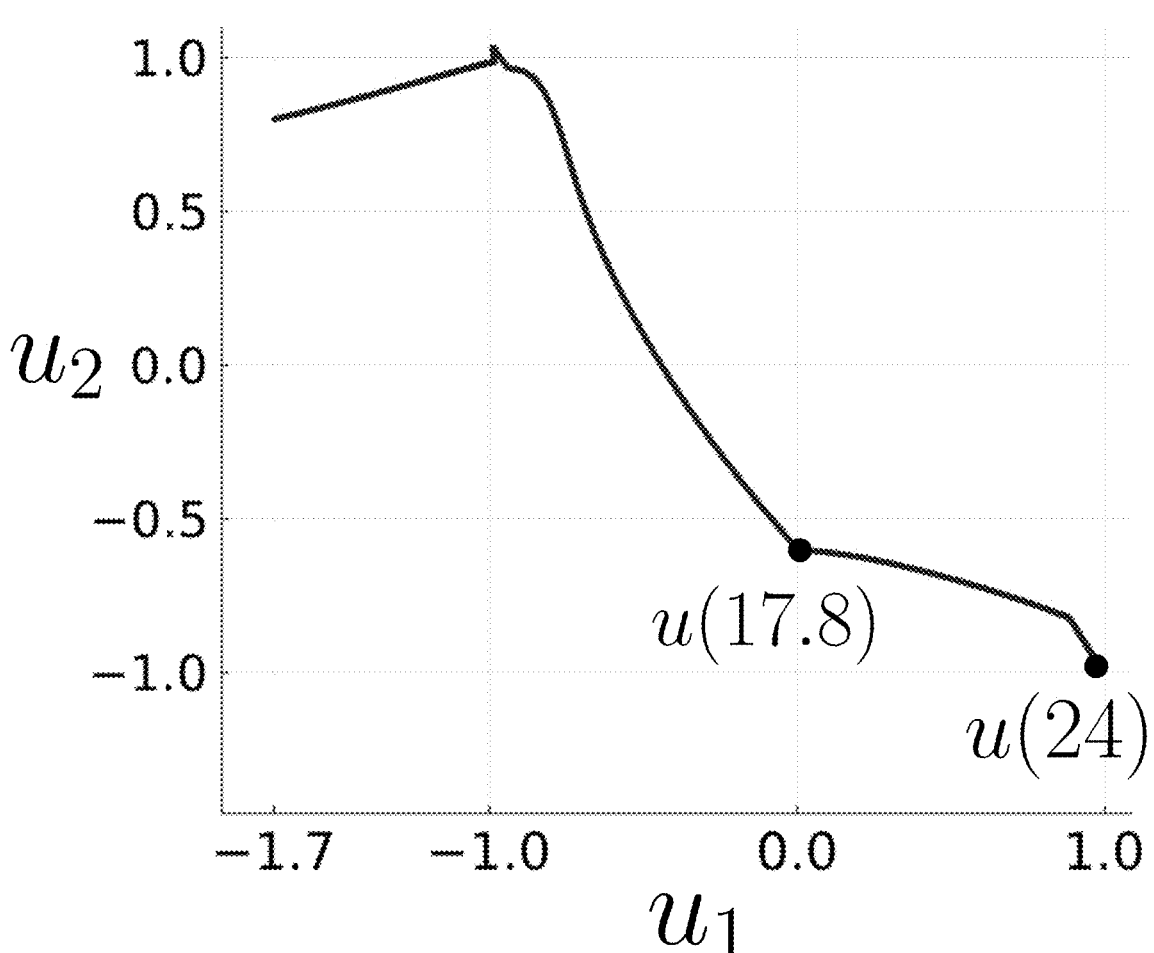
FIG. 20 shows an embodiment of machine-implemented method 5 (meta operator 5) successfully healing a noise attack.

FIG. 20 shows that machine-implemented method 5 (meta operator 5) successfully heals the orbit on the same two pulse (FIG. 18) noise attack that caused meta operator 2 to fail with noise constants $K_{1,3}=K_{2,3}=0$ and $K_{1,4}=K_{2,4}=1$. (FIG. 19 shows that meta operator 2 fails with these circuit values.)

Variables $u_2$, $u_4$, and we have cyclic interdependencies. In meta operator 5, $$\frac{du_2}{dt}$$

depends upon $u_4$ and $u_6$.

$$\frac{du_4}{dt}$$

depends upon $u_2$ and $u_6$; and $$\frac{du_6}{dt}$$

depends upon $u_2$ and $u_4$. If variable y depends upon variable x, write x→y. From the three equations, there are six variable 2-cycles: all $u_i$→$u_j$→$u_i$ such that i≠j and {i, j} ⊂ {2, 4, 6}. There are six variable 3-cycles: all $u_i$→$u_j$→$u_k$→$u_i$ such that sets {i, j, k}={2, 4, 6}.

Intuitively, when noise $\eta_3$ attacks $u_4$, $u_2$ and $u_6$ restore $u_4$. When $\eta_2$ attacks $u_2$, then $u_4$ and $u_6$ still agree so they can heal $u_2$. Depending upon the time, $u_2$, $u_4$, and we play different roles. This is why six variables can ameliorate a two pulse attack on $u_2$ and $u_4$.

Figure 21:
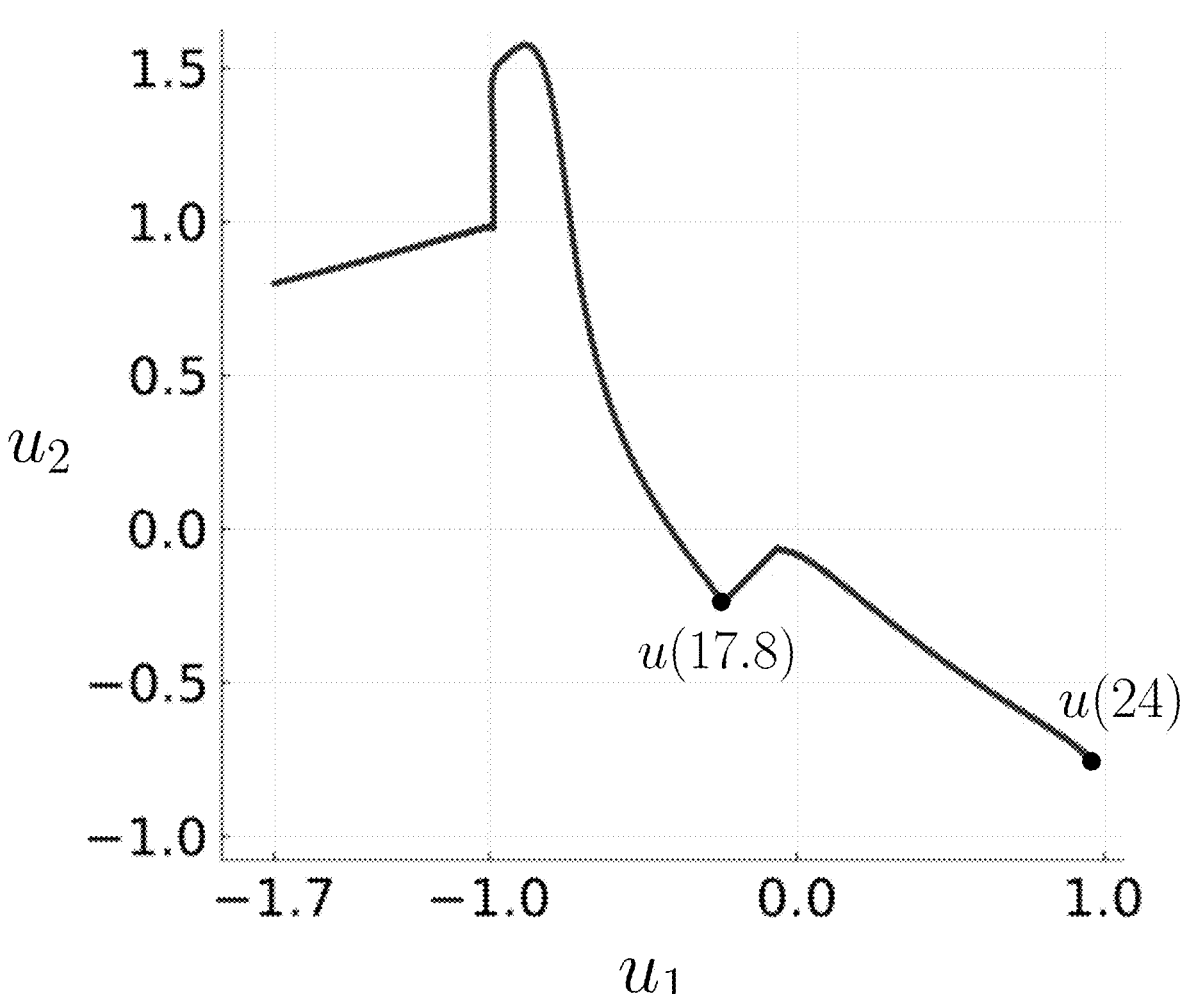
FIG. 21 shows an embodiment of machine-implemented method 5 (meta operator 5) healing a noise attack near circuit parameter values that cause a bifurcation.
Figure 22:
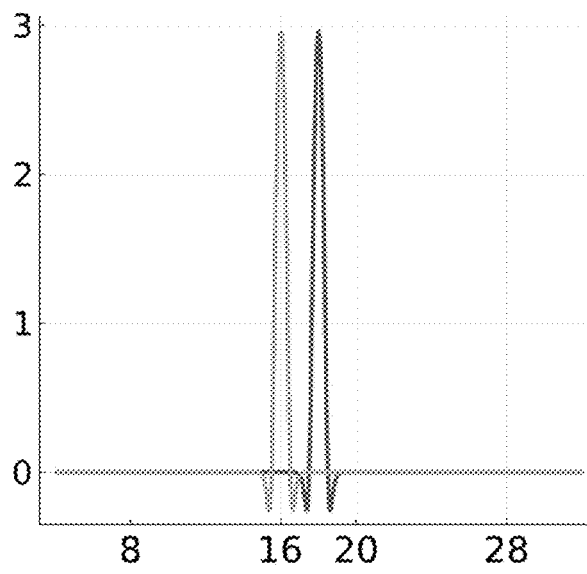
FIG. 22 shows an embodiment of machine-implemented method 5 (meta operator 5) successfully healing a noise attack by two noise pulses whose peaks occur at different times.
Figure 22:
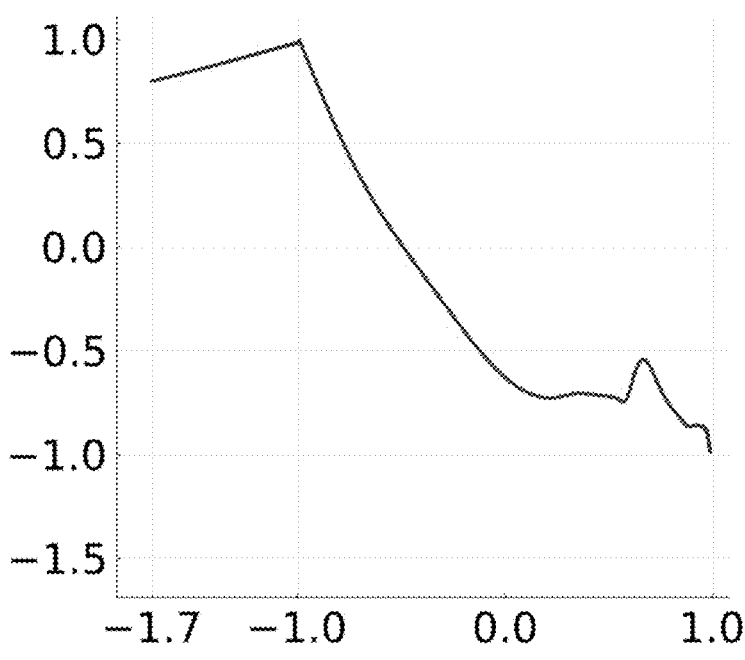

Keeping $\eta_3$'s parameters fixed, if $\delta_2$ lies in (½, ¾], meta operator (machine-implemented method) 5 successfully heals the noise. When $\delta_2=0.76$ and $\theta_1=\theta_2=0.2$, a bifurcation in the circuit's dynamical behavior is about to occur, which causes the circuit to no longer perform its intended flip-flop computation. (A bifurcation occurs when the orbit does not cross $u_2=u_1$.) At $\zeta_2=0.76$, FIG. 21 shows that meta operator 5 successfully heals the noise. At $\delta_2 \geq 0.77$, meta operator (machine-implemented method) 5 is unable to heal the noise attack.

The relative timing of noise pulses is also critical. If pulses $\eta_2$ and $\eta_3$ are separated in time, meta operator (machine-implemented method) 5 is far more robust: when $\delta_2=1$, and $\eta_2$'s time location $$l = \frac{37}{2},$$

meta operator (machine-implemented method) 5 successfully heals, shown in FIG. 20, the two time separated noise pulses in FIG. 18. (The peak amplitudes of $\eta_2$, $n_3$ correspond to 9 volts, which is substantially above a typical range of 1.2 to 5 volts for commercial flip-flops, yet meta operator (machine-implemented method) 5 still heals the orbit.)

As the number of variables n increases, the circuit complexity of machine-implemented methods increases. When n is beyond 8, there are more potential variable interdependencies that can create robust healing of the circuit. If n≥8, successful noise attacks require more noise pulses delivered on multiple variables. (This means Mallory requires more electromagnetic energy to deliver her noise attacks.) Also, it is far more challenging for Mallory to inject noise pulses so that on multiple variables their time locations overlap. (This means Mallory's multiple noise pulses need to be time coordinated to be effective.)

A Self-Modifiable Circuit that Heals

FIG. 23 shows a self-modifiable electronic circuit, comprised of subcircuits $C_1$, $C_2$, and subcircuit S. In one embodiment, the electronic circuit in FIG. 23 implements machine-implemented method 2 (meta operator 2) in semiconductor hardware, based on transistors. Similar to FIG. 2, in some embodiments, subcircuit $C_1$ in FIG. 23 is constructed from four NAND gates and one NOT gate. Similar to FIG. 2, in some embodiments, subcircuit $C_2$ in FIG. 23 is constructed from four NAND gates and one NOT gate. In some embodiments, the NAND gates are constructed from transistors. In FIG. 23, subcircuits $C_1$ and $C_2$ differ from FIG. 2 because they both have input and output lines connected to a third subcircuit S.

Our self-modifiable circuit has two copies $C_1$ and $C_2$ of the flip-flop circuit in FIG. 2. Subcircuits $C_1$ and $C_2$ are shown in FIG. 23. Data input lines D(t) and clock inputs CLK are the same for $C_1$ and $C_2$. Let $Q_1(t)$ and $\overline{Q_1}(t)$ are the two outputs of $C_1$. Let $Q_2(t)$ and $\overline{Q_2}(t)$ are the two outputs of $C_2$.

FIG. 23 shows an additional self-modifiable subcircuit S that receives D(t), CLK, $Q_1(t)$, $\overline{Q_1}(t)$, $Q_2(t)$, and $\overline{Q_2}(t)$ as inputs. $Q_1(t)$ and $\overline{Q_1}(t)$ correspond to signal variables $u_1$ and $u_2$. $Q_2(t)$ and $\overline{Q_2}(t)$ correspond to healing variables $u_3$ and $u_4$. $C_1$ also receives outputs from S.

In an embodiment, machine-implemented method 2 (meta operator 2) describes how subcircuit S behaves. In some embodiments, shown in FIG. 23, self-modifiable subcircuit S computes $$\frac{d\omega_2}{dt} = \frac{du_4}{dt} - \frac{du_2}{dt}$$

and $$\frac{d\omega_1}{dt} = \frac{du_3}{dt} - \frac{du_1}{dt}.$$

If thresholds $\theta_1$ or $\theta_2$ are exceeded, then S sends output that self-modifies circuit $C_1$ according to the section titled "Adding Healing Variables".

Figure 24:
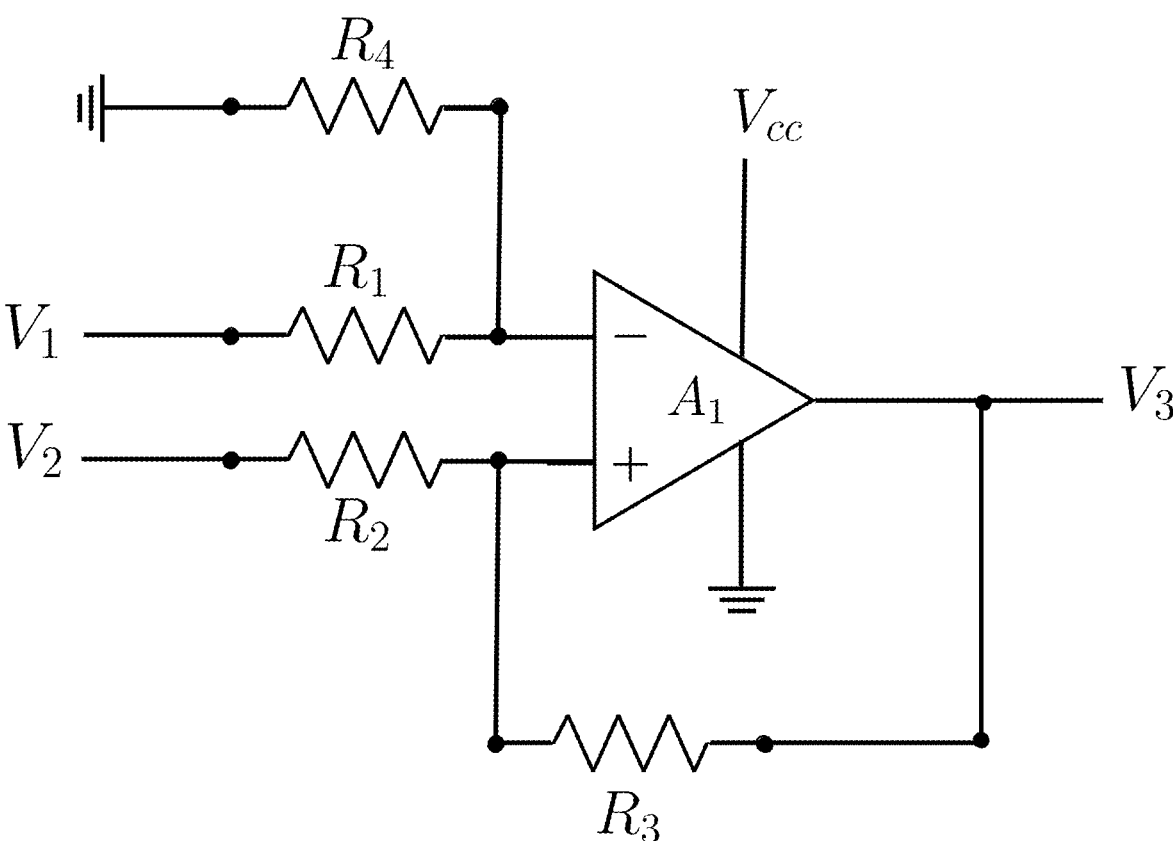
FIG. 24 shows an embodiment of a voltage difference circuit. The circuit finds the voltage difference between input lines $V_1$ and $V_2$ and the difference is at output line $V_3$. The component labelled $A_1$ is an operational amplifier. The components labelled by $R_1$, $R_2$, $R_3$, and $R_4$ are resistors. $V_{cc}$ is the power supply voltage. The symbols with three parallel line segments of decreasing length indicate a ground voltage.
Figure 25:
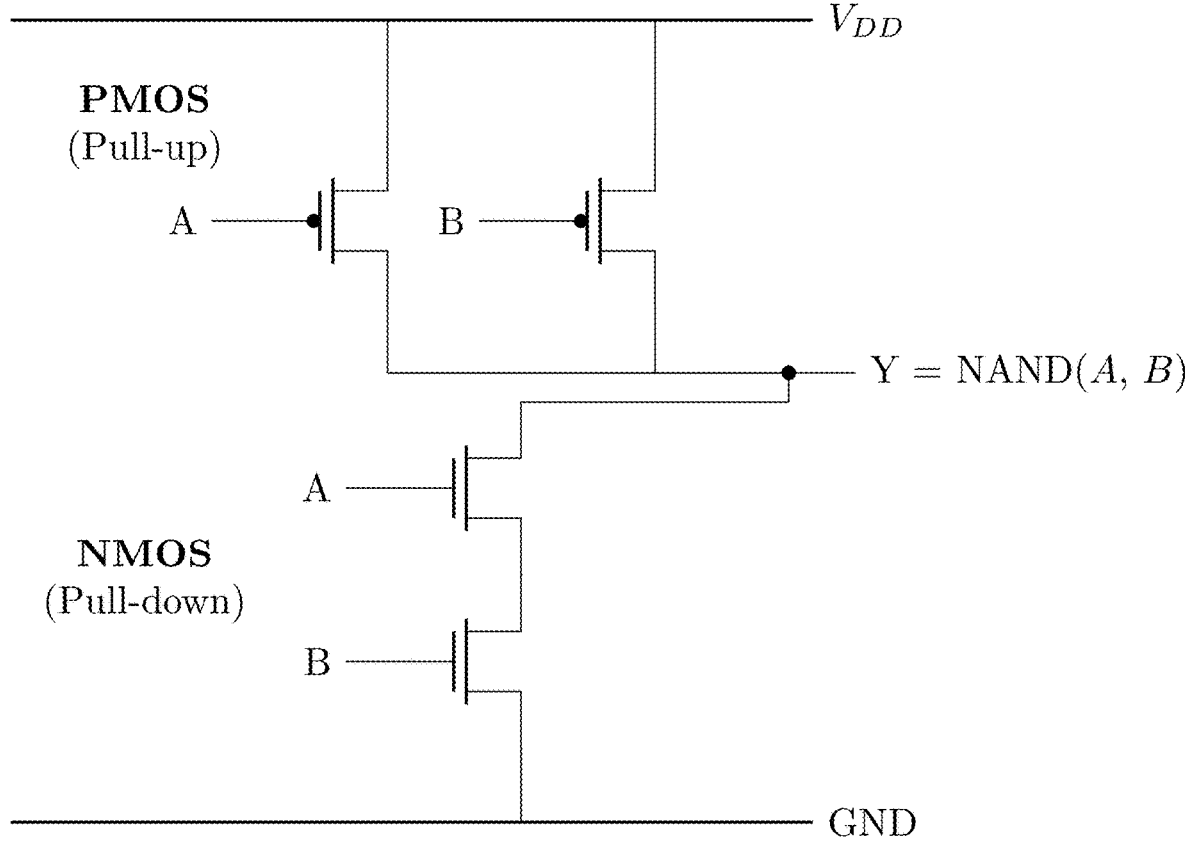
FIG. 25 shows a NAND gate circuit composed of transistors.

In an embodiment, subcircuit S contains a voltage difference circuit, as shown in FIG. 24. In an embodiment, the voltage output of line $Q_1(t)$ is the input line to $V_1$, shown in FIG. 24, and the voltage output of line $Q_2(t)$ is the input line to $V_2$ in FIG. 24. In an embodiment, if the voltage in $V_3$ (FIG. 24) exceeds a threshold voltage value, then subcircuit S self-modifies the voltage input in subcircuit $C_1$. In an embodiment, subcircuit S self-modifies the voltage input in subcircuit $C_1$ according to machine implemented method 2. In an embodiment, an inductor is used by self-modifiable circuit S to self-modify the voltage input.

In other embodiments, a self-modifiable circuit may contain a third copy $C_3$ of the flip-flop circuit in FIG. 2. In some embodiments, a self-modifiable circuit may contain a subcircuit S that contains two or more voltage difference subcircuits as shown in FIG. 24. In some embodiments, the voltage output line $Q_1(t)$ is the input line to $V_1$, shown in FIG. 24, and the voltage output of line $Q_2(t)$ is the input line to $V_2$ in a first voltage difference subcircuit; and the voltage output line $Q_1$ (t) is the input line to $V_1$, shown in FIG. 24, and the voltage output of line $Q_3(t)$ is the input line to $V_2$ in a second distinct voltage difference subcircuit that is also part of subcircuit S.

In some embodiments, a self-modifiable circuit may contain a subcircuit S that contains three voltage difference subcircuits as shown in FIG. 24. In some embodiments, the voltage output line $Q_1(t)$ is the input line to $V_1$, shown in FIG. 24, and the voltage output of line $Q_2(t)$ is the input line to $V_2$ in a first voltage difference subcircuit; and in a second distinct voltage difference subcircuit that is also part of subcircuit S, the voltage output line $Q_1(t)$ is the input line to $V_1$, shown in FIG. 24, and the voltage output of line $Q_3(t)$ is the input line to $V_2$; and in a third distinct voltage difference subcircuit that is also part of subcircuit S, the voltage output line $Q_2(t)$ is the input line to $V_1$, shown in FIG. 24, and the voltage output of line $Q_3(t)$ is the input line to $V_2$.

Healing with Non-fixed point Machine-implemented Methods

In digital hardware design and theoretical computer science, the final result of a computation is a fixed point. After a Turing machine halts [44], the final result is the machine's state and symbols stored on the tape. A Turing machine's halting configuration is represented by a fixed point.

Fixed points are simpler objects in dynamical systems theory. Besides fixed points, nonlinear systems can have periodic orbits, limit cycles, dense orbits, and chaotic attractors.

Some approaches that do not use fixed points as machine-implemented methods:

Use a chaotic attractor decentralize signal and healing among multiple variables.

Use bifurcation theory to design new meta operators.

Use quantum entanglement to self-modify a quantum dynamical system.

Although the invention(s) have been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

REFERENCES

[1] Abhijit Mohanta, Anoop Saldanha. Malware Analysis and Detection Engineering. 1st Edition, Apress, 2020.

[2] Donald Knuth. The Art of Computer Programming. Fundamental Algorithms. Volume 1, 3rd Edition. Addison-Wesley, 1997.

[3] H. Abelson, G. Sussman. Structure and Interpretation of Computer Programs. MIT Press, 491-610, 1996.

[4] John Hennessy, David Patterson. Computer Architecture. 5th Edition, Morgan Kaufmann, 2012.

[5] John Maxwell. "On Governors." Proceedings of the Royal Society, 100, 1868.

[6] Arash YoosefDoost, William Lubitz. "Archimedean Screw Design." Energies 14, 7812. MDPI, 2021.

[7] Michael Tabor. Chaos and Integrability in Nonlinear Dynamics. John Wiley, 1989.

[8] Misha Gromov. Metric Structures for Riemannian and Non-Riemannian Spaces. Birkhäuser, 1999.

[9] James R. Munkres. Topology. Prentice-Hall, 1975.

[10] Li C., Raghunathan A., Jha N. K. (2011) "Hijacking an insulin pump: Security attacks and defenses for a diabetes therapy system." *IEEE Intl. Conf. on e-Health Networking, Applications and Services.*

[11] Halperin D., Heydt-Benjamin T. S., et. al. (2008) "Pacemakers and implantable cardiac defibrillators: Software radio attacks and zero-power defenses." *IEEE Symposium on Security and Privacy.*

[12] Korak T., Hoefler M. (2014) "On the effects of clock and power supply tampering on two microcontroller platforms." *Workshop on Fault Diagnosis and Tolerance in Cryptography.* 8-17, September 2014.

[13] Giechaskiel I., Rasmussen K. B. (2019) "Sok: Taxonomy and challenges of out-of-band signal injection attacks and defenses." CoRR 1901.06935.

[14] Horstmann J. U., Eichel H. W., Coates R. L. (1989) "Metastability behavior of CMOS ASIC flip-flops in theory and test." *IEEE Journal of Solid-State Circuits*. 24(1), 146-157, February 1989.

[15] Valbuena L., Heileman G. L., Hemmady S., Schamiloglu E. (2019) "Simplified Flip-Flop Gate Model for EEMI Injection." *Intl. Conf. on Electromagnetics in Advanced Applications*. 845-850.

[16] M. S. Fiske. "Toward a Mathematical Understanding of the Malware Problem." Proc. of the 53rd Hawaii Intl. Conf. on System Sciences. Jan. 7-10, 2020.

[17] Daniel W. McShea. "Complexity and evolution: What everybody knows." Biology and Philosophy. Springer, 6, 303-324, July 1991.

J. Lukeš, J. Archibald, et. al. "How a Neutral Evolutionary Ratchet Can Build Cellular Complexity." IUBMB Life. 63(7), 528-537, July 2011.

[19] E. C. Friedberg, et. al. DNA Repair and Mutagenesis. ASM Press, 2nd Edition, 2006.

[20] D. E. Rasmussen, R. B. Painter. "Evidence for repair of ultra-violet damaged DNA in cultured mammalian cells." Nature. 203, 1360-1362, 1964.

[21] George Kampis. Self-Modifying Systems in Biology and Cognitive Science. Pergamon Press, 1991.

[22] Y. Ke, et. al. "Repairing Programs with Semantic Code Search." 2015 30th IEEE/ACM Intl. Conf. on Automated Software Engineering. 295-305, 2015.

[23] Eugene Eberbach. "Selected Aspects of the Calculus of Self-Modifiable Algorithms Theory." ICCI 1990. LNCS 468, Springer, 1991.

[24] Michael S. Fiske. "Turing Incomputable Computation." Turing-100. EasyChair 10, 69-91, 2012.

[25] Wilfrid Rall. The Theoretical Foundation of Dendritic Function. Papers of Wilfrid Rall. MIT Press, 1995.

[26] Greg J. Stuart, Nelson Spruston. "Dendritic Integration: 60 years of progress." Nature Neuroscience. 18(12), 1713-1721, December 2015.

[27] Michael S. Fiske. "The Active Element Machine." Proceedings of Computational Intelligence. Springer 391, 69-96, 2011.

[28] A. V. Aho, R. Sethi, J. D. Ullman. Compilers: Principles, Techniques and Tools. Addison-Wesley, 1988.

[29] J. Hopcroft, J. D. Ullman. Intro. to Automata Theory, Languages, and Computation. Addison-Wesley, 1979.

[30] J. Backus. "Can programming be liberated from the von neumann style?: a functional style and its algebra of programs." Comm. of ACM, 21(8), 613-641, 1978.

[31] Abraham Robinson. Non-standard Analysis. Princeton University Press, 1996.

[32] R. L. Graham, V. Rödl. Numbers in Ramsey Theory. Surveys in Combinatorics, LMS Lecture Note Series 123. Cambridge University Press, 1987.

[33] Vera Rosta. "Ramsey Theory Applications." The Electronic Journal of Combinatorics, December 2004.

[34] S. Burr. "Determining Generalized Ramsey Numbers is NP-hard." Ars Combinatoria. 17, 21-25, 1984.

[35] Brian Kernighan, Dennis Ritchie. The C Programming Language. 2nd Edition, Prentice Hall, 1988.

[36] NIST. Secure Hash Standard FIPS-180-4. 2012.

[37] Jeff Bezanson, Alan Edelman, Stefan Karpinski, Viral Shah. "Julia: A fresh approach to numerical computing." SIAM review. 59(1), 65-98, 2017.

[38] Terence Tao. An Introduction to Measure Theory. American Mathematical Society. Volume 126, 2011.

[39] Axel Thue. "Probleme über Verändergungen von Zeichenreihen nach gegebenen Regeln." Christiana Videnskabs-Selskabs Skrifter, I. 10, 1914.

[40] Herrero-Collantes M., Garcia-Escartin J. C. (2017) "Quantum random number generators." *Reviews of Modern Physics*. 89(1), 015004, APS.

[41] Claude E. Shannon. "A Mathematical Theory of Communication." Bell Systems Technical Journal. 27, 379-423, 1948.

[42] Thomas M. Cover, Joy A. Thomas. Elements of Information Theory. 2nd Edition, Wiley & Sons, 2006.

[43] Richard Hamming. "Error Detecting and Error Correcting Codes." *Bell Technical Journal*. 29(2), 147-160, April 1950.

[44] Alan M. Turing. "On computable numbers, with an application to the Entscheidungsproblem." Proc. London Math. Soc. Series 2. 42 Parts 3, 4, 230-265, 1936.

[45] Stephen Cook. "The P versus NP Problem." Clay Math Institute, 2000. www.aemea.org/math/pvsnp.pdf Official Problem Description.

[46] Klint Finley. Chinese Supercomputer Is Still the World's Most Powerful. Wired Magazine. Nov. 18, 2013.

[47] A. F. Webster and S. E. Tavares. On the Design of S-Boxes. Advances in Cryptology. CRYPTO 85 Proceedings. LNCS 218. Springer, 523-534, 1986.

[48] NIST. FIPS-180-2: Secure Hash Standard, August 2002. http://www.itl.nist.gov/fipspubs/.

[49] Guido Bertoni, Joan Daemen, Michael Peeters, Gilles Van Assche. Keccak Reference 3.0 2011. http://keccak-.noekeon.org/ http://en.wikipedia.org/wiki/Keccak

[50] Jean-Philippe Aumasson, Samuel Neves, Zooko Wilcox-O'Hearn, Christian Winnerlein. BLAKE. https://131002. net/blake/

[51] Praveen Gauravaram, Lars Knudsen, Krystian Matusiewicz, Florian Mendel, Christian Rechberger, Martin Schläffer, and Søren S. Thomsen. Grøstl—a SHA-3 candidate. http://www.groestl.info

[52] Hongjun Wu. The Hash Function JH. 2011. http://ehash.iaik.tugraz.at/wiki/JH http://www3. ntu.edu.sg/home/wuhj/research/jh/jh_round3. pdf

[53] Niels Ferguson, Stefan Lucks, Bruce Schneier, Doug Whiting, Mihir Bellare, Tadayoshi Kohno, Jon Callas, Jesse Walker. The Skein Hash Function Family. 2010. https://www.schneier.com/skein1.3. pdf http://en.wikipedia.org/wiki/Skein_(hash_function)

The invention claimed is:

1. A circuit-implemented method comprising:

wherein a circuit contains a first subcircuit and a second subcircuit and a third subcircuit;

wherein the first subcircuit computes the digital logic of a D flip-flop;

wherein the second subcircuit computes the digital logic of a D flip-flop;

wherein the first subcircuit has a first output line, and the second subcircuit has a second output line;

wherein the third subcircuit receives input from the first output line and the second output line;

wherein the third subcircuit measures a voltage difference between the input of the first output line and the input of the second output line;

wherein if the voltage difference exceeds a threshold voltage, the third subcircuit adjusts the voltage of the first output line to the same voltage as the second output line;

wherein the first subcircuit contains at least one NAND gate;

wherein the second subcircuit contains at least one NAND gate;

wherein the third subcircuit contains an operational amplifier.

2. The circuit-implemented method of claim 1 comprising:

wherein the at least one NAND gate in the first subcircuit is constructed from transistors;

and wherein the at least one NAND gate in the second subcircuit is constructed from transistors.

\* \* \* \* \*